(12) United States Patent
Miller

(10) Patent No.: US 7,796,526 B2
(45) Date of Patent: Sep. 14, 2010

(54) VERSATILE COMMUNICATION NETWORK TEST APPARATUS AND METHODS

(75) Inventor: Walter L. Miller, Bargersville, IN (US)

(73) Assignee: Acterna, Indianapolis, IN (US)

( * ) Notice: Subject to any disclaimer, the term of this patent is extended or adjusted under 35 U.S.C. 154(b) by 1662 days.

(21) Appl. No.: 10/978,698

(22) Filed: Nov. 1, 2004

(65) Prior Publication Data

US 2005/0286486 A1 Dec. 29, 2005

Related U.S. Application Data

(60) Provisional application No. 60/516,189, filed on Oct. 31, 2003.

(51) Int. Cl.
*G01R 31/08* (2006.01)
*H04J 3/14* (2006.01)

(52) U.S. Cl. ........................ 370/241; 370/252

(58) Field of Classification Search .............. 370/241, 370/252
See application file for complete search history.

(56) References Cited

U.S. PATENT DOCUMENTS

| | | | |
|---|---|---|---|
| 3,908,165 A | 9/1975 | Cauldwell | |
| 5,121,342 A | 6/1992 | Szymborski et al. | |
| 5,263,185 A | 11/1993 | Bush | |
| 5,451,839 A | 9/1995 | Rappaport et al. | |
| 5,602,750 A | 2/1997 | Severt et al. | |
| 5,867,206 A | 2/1999 | Voght et al. | |
| 5,938,737 A | 8/1999 | Smallcomb et al. | |
| 6,061,393 A | 5/2000 | Tsui et al. | |
| 6,061,398 A | 5/2000 | Satoh et al. | |
| 6,229,532 B1 | 5/2001 | Fujii | |
| 6,233,274 B1 | 5/2001 | Tsui et al. | |
| 6,285,685 B1 | 9/2001 | Bum | |

(Continued)

OTHER PUBLICATIONS

"QAMLINK™ Single-Chip 4-Channel VoIP Residential Gateway IC." Broadcom. http://www.broadcom.com/products/3352.html. © 2002 Broadcom Corporation Jan. 31, 2003. 2 pages.

"QAMLINK™ Single-Chip 4-Channel VoIP Broadband Gateway IC." BCM3352 Product Brief, Broadcom Corporation, Irvine, CA © 2002, 2 pages.

(Continued)

*Primary Examiner*—Kevin C Harper
(74) *Attorney, Agent, or Firm*—Matthew A. Pequignot; Pequignot + Myers LLC

(57) ABSTRACT

An analysis device includes a connector, a display, a digital communication circuit and a processing circuit. The connector is configured to connect to a coaxial cable of a communication system, the communication system including a connection to a network employing internet protocol communications. The digital communication circuit is operably connected to the connector and configured to communicate information signals within the communication system via the connector. The digital communication circuit is operable to establish at least two types of connections through the communication system. The first type of data connection employs an internet protocol, while the second type of internet data connection employs a voice over internet protocol. The processing circuit is connected to the digital communication circuit. The processing circuit is operable to obtain diagnostic data relating to each of the first type of connection and the second type of connection. The processing circuit is further operable to cause the display to display information representative of the diagnostic data.

14 Claims, 12 Drawing Sheets

U.S. PATENT DOCUMENTS

| | | |
|---|---|---|
| 6,310,646 B1 | 10/2001 | Shi et al. |
| 6,385,300 B1 | 5/2002 | Mohammadian et al. |
| 6,430,185 B1 | 8/2002 | Kerns et al. |
| 6,487,592 B1 | 11/2002 | Sawyer et al. |
| 6,493,876 B1 | 12/2002 | DeFreese et al. |
| 6,510,557 B1 | 1/2003 | Thrift |
| 6,519,241 B1 | 2/2003 | Theimer |
| 2003/0095591 A1* | 5/2003 | Rekai et al. .......... 375/225 |
| 2004/0073937 A1* | 4/2004 | Williams .............. 725/107 |
| 2006/0048200 A1* | 3/2006 | Jaworski et al. ...... 725/107 |
| 2009/0097408 A1* | 4/2009 | Corcoran .............. 370/250 |

OTHER PUBLICATIONS

"Broadcom adds VoIP Telephony and Home Networking Technology to Industry-Leading DOCSIS Cable Modem Chip," http://www.broadcom.com/cgi-bin/pr/prps.cgi?pr_id_PR000919. Sep. 19, 2000, 5 pages.

"QAMLINK™ Single-Chip 4-Channel VoIP Broadband Gateway IC." BCM3352 Product Brief, 2000 Broadcom Corporation, 2 pages.

McIntosh, David, "Building a PacketCable™ Network: A Comprehensive Design for the Delivery of VoIP Services," SCTE Cable Tec-Expo® 2002, 10 pages.

* cited by examiner

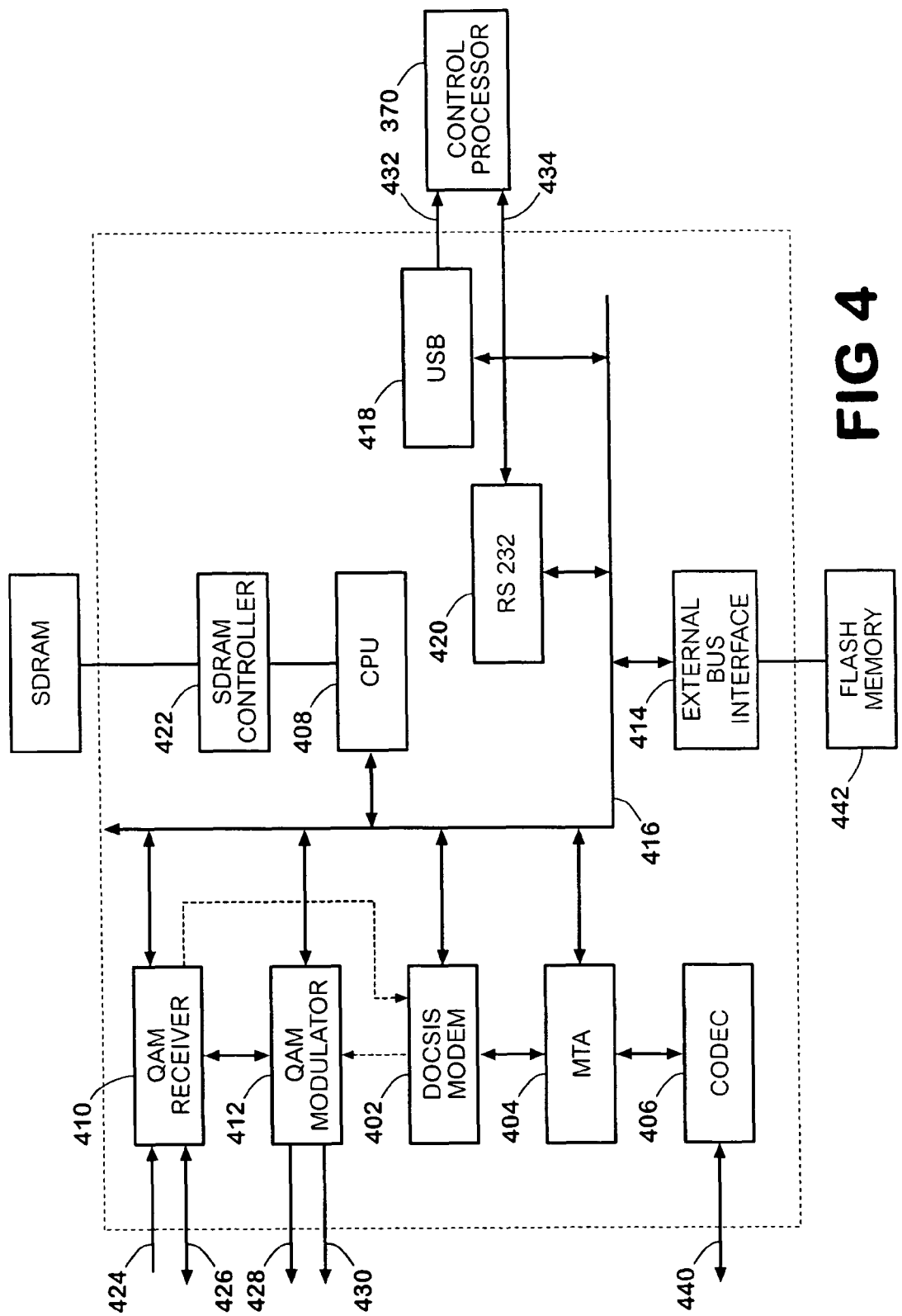

VERSATILE COMMUNICATION NETWORK TEST APPARATUS AND METHODS

This application claims the benefit of U.S. Provisional Patent Application Ser. No. 60/516,189, filed Oct. 31, 2003, and which is incorporated herein by reference.

CROSS REFERENCE TO RELATED APPLICATIONS

Cross-reference is made to co-pending U.S. patent application Ser. No. 10/978,704 [Express Mail No. EV505540125US], entitled "Signal Level Measurement and Data Connection Quality Analysis Apparatus and Methods", filed Nov. 1, 2004, and to co-pending U.S. patent application Ser. No. 10/978,699, [Express Mail No. EV505540139US], entitled "Communication Network Analysis Apparatus With Internetwork Connectivity", filed Nov. 1, 2004.

FIELD OF THE INVENTION

The present invention relates generally to broadband communication networks, and more particularly, to testing and/or analysis of broadband communication networks that provide VoIP services.

BACKGROUND OF THE INVENTION

Cable networks are communication networks that communicate broadband communication signals between a centralized headend and a plurality of customer premise devices. Cable networks have many forms, but typically include a dispersed network of coaxial cable. Many cable networks further include a substantial portion of fiber optic lines. Such networks are known as hybrid fiber coax or HFC networks. Such networks are common.

Historically, cable networks were employed primarily for the delivery of the television program signals. To this end, the cable network headend transmitted a broadband signal to each subscriber through a hierarchical network of coaxial cable, referred to as the cable plant. The broadband signal was divided into a plurality of channels, each channel occupying an approximately 6 or 8 MHz wide band of the overall broadband signal.

The proper operation of cable systems involves field testing. Because the cable plant is dispersed throughout the entire cable service area, the network can experience damage or other detrimental phenomena in varied, isolated portions of the network. As a result, many customers may have excellent service while a few customers cannot receive one or more channels clearly due to a localized problem. Cable service providers have often used handheld signal measurement equipment to help diagnose problems and perform network analysis.

Historically, the test equipment included an RF signal receiver and circuitry for measuring signals received on select channels of the system. Measurement of a large number of channels provides a rough spectrum analysis of the cable network. Various test devices that measured analog cable television channels were developed.

While the cable television system employed analog NTCS standard television signals for years, cable service providers have more recently been switching over to digital television signal broadcasting because of the better cost/service ratios. Because many of the field test equipment developed for cable networks was specifically designed to test analog cable television channels, new digital cable field measurement technologies had to be developed. Such devices were developed, and typically measured the signal level available on selected (or all) channels of the cable television system.

The latest trend in cable systems is to provide two way high speed data communications through the cable network. A customer may thus use their coaxial cable connection to obtain both audio-visual broadcast programming information and for access to the Internet for electronic mail, downloads and browsing. The HFC network is further configured to support a specialized form of telephone service known as Voice over Internet Protocol or VoIP.

At present, signal level measurements and other related physical layer measurements still provide useful information in troubleshooting and analyzing network performance. However, there is a need for more extensive testing of the various services provided to the customer.

SUMMARY OF THE INVENTION

The present addresses the above need, as well as others, by providing a combination VoIP analysis and physical layer test device that performs tests relating to VoIP service (such as provisioning process indicator, packet loss, delay and/or jitter) as well as signal level measurements, related physical layer measurements, and Docsis related measurements. The device is preferably embodied in a handheld, portable device.

A first embodiment of the invention is an analysis device that includes a connector, a display, a digital communication circuit and a processing circuit. The connector is configured to connect to a coaxial cable of a communication system, the communication system including a connection to a network employing internet protocol communications. The digital communication circuit is operably connected to the connector and configured to communicate information signals within the communication system via the connector. The digital communication circuit is operable to establish at least two types of connections through the communication system. The first type of data connection employs an internet protocol, while the second type of internet data connection employs a voice over internet protocol. The processing circuit is connected to the digital communication circuit. The processing circuit is operable to obtain first diagnostic data relating to the first type of connection and operable to obtain second diagnostic data relating to the second type of connection. The processing circuit is further operable to cause the display to display information representative of the first diagnostic data and display information representative of the second diagnostic data.

A second embodiment of the invention is an analysis device that includes a connector, a digital communication circuit, a display, and a processing circuit. The connector is configured to connect to a coaxial cable of a communication system, the communication system including a connection to a telephone network. The digital communication circuit is operably connected to the connector and is configured to communicate information signals within the communication system via the connector. The digital communication circuit is also operable to establish a voice over internet protocol data connection through the communication system. The processing circuit is connected to the digital communication circuit. The processing circuit is operable to obtain first diagnostic data relating to a set of parameters of the connection parameters and operable to obtain second diagnostic data relating to connection performance. The processing circuit is further operable to cause the display to display information representative of the first diagnostic data and display information representative of the second diagnostic data.

The above described features and advantages, as well as others, will become more readily apparent to those of ordinary skill in the art by reference to the following detailed description and accompanying drawings. Some variations of the invention may solve other problems not mentioned, and may only solve problems related to those described above.

BRIEF DESCRIPTION OF THE DRAWINGS

FIG. 4 shows a schematic block diagram of an exemplary embodiment of the modem circuit of the test apparatus of FIG. 3;

DETAILED DESCRIPTION

Figure 1:
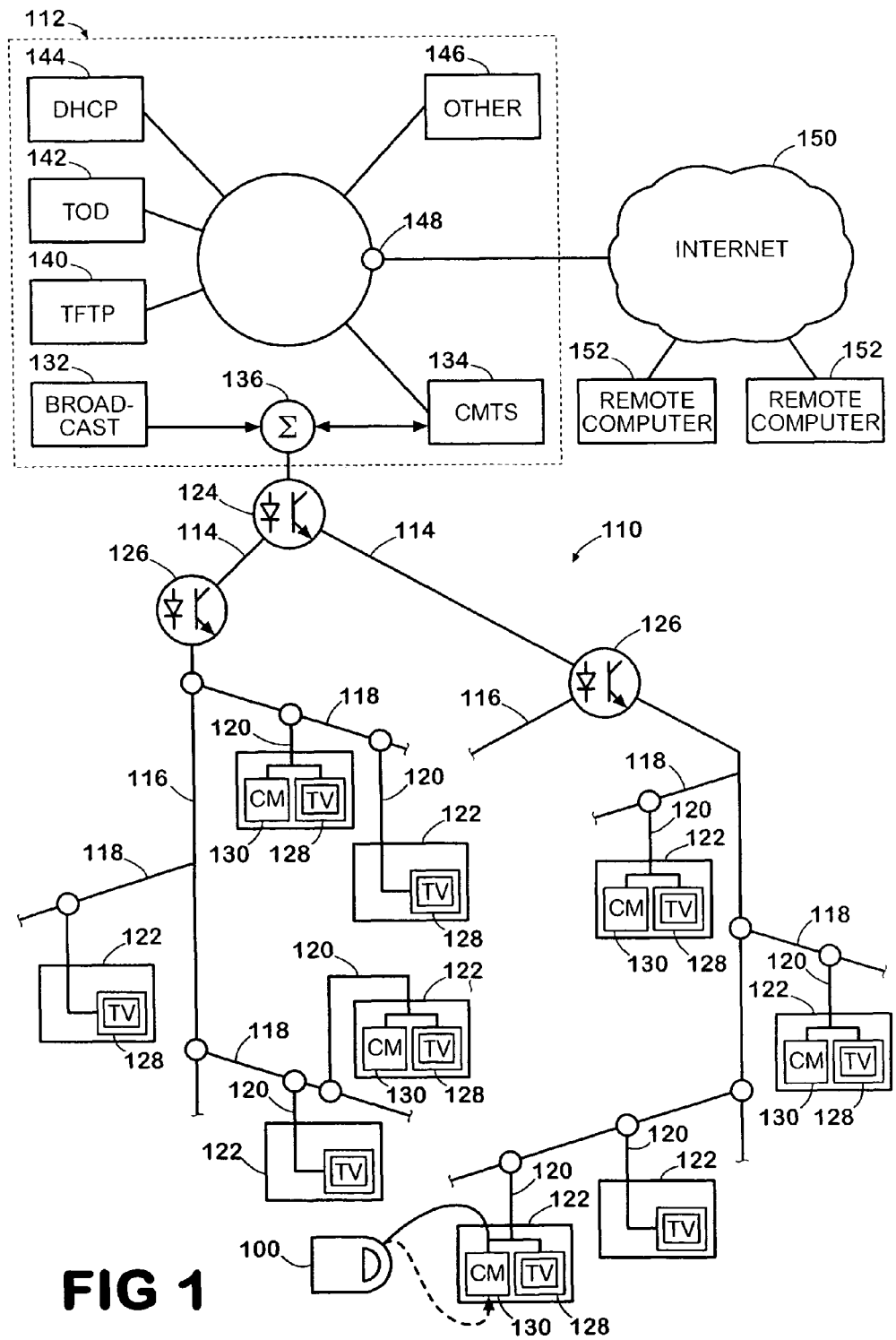
FIG. 1 shows a block diagram of an exemplary broadband communication system and an exemplary testing device configured in accordance with aspects of the invention.

FIG. 1 shows an exemplary test configuration that employs an analysis device 100 according to the present invention within a communication network 110. The communication network 110 is a land-based broadband network typically known as a cable network. In the embodiment described herein, the communication network 110 is a hybrid fiber coax or HFC network that employs both fiber optic links and coaxial cable to effect radio frequency communications between a plurality of subscribers and a network headend 112. The network headend 112 is further operable to provide Internet communications between a plurality of subscribers and one or more devices 152 connected to the Internet 150. The devices 152 are external to the communication network 110. The analysis device 100 is operable to test multiple parameters of the network, including by way of example, the signal strength at a remote location of the network 110, whether Internet connectivity is available at remote locations of the network 110, and/or digital channel quality at remote locations of the network 110. The precise combination of features in the analysis device 100 may vary from embodiment to embodiment.

In further detail, the communication network 110 includes a headend 112, a fiber plant 114, a coaxial cable plant 116, and a plurality of network tap lines 118, a plurality of subscriber drop lines 120, a plurality of subscriber sites 122. In the embodiment described herein, a headend optical encoder/decoder 124 connects the network headend 112 to the fiber plant 114, and node optical encoder/decoders 126 connect the fiber plant 114 to the coaxial cable plant 116. As is known in the art, the fiber plant 114 is used as a dedicate line that provides communication between discrete portions of the network 110 and the headend 112. The coaxial cable plant 116 is used to distribute network communication line within each discrete portion of the network 110.

Both the fiber plant 114 and the coaxial cable plant 116 are operable to propagate broadband signals, including but not necessarily limited to signals ranging from about 4 MHz to about 1000 MHz. The frequency spectrum is divided into channels that are approximately 6 or 8 MHz wide and include a carrier frequency that is used to define the channel. In general, a carrier signal at the channel frequency is modulated with an information signal using either analog or digital techniques to provide content for the channel.

The headend 112 includes a source of broadcast program information 132, a cable modem termination system (CMTS) 134, a combiner 136, and a server network 138. The CMTS 134 is operably coupled to the combiner 136 and the server network 138. The source of broadcast program information 132 is also coupled to the combiner. The combiner 136 is operably connected to the optical encoder/decoder 124.

The source of broadcast program information 132 may suitably any well known device or set of circuits that obtain broadcast audio and/or visual information for broadcast over the network 110. For example, the source of broadcast program information 132 generally provides local television channels, subscription television channels, pay and free audio channels, free non-local television channels, television guide information and the like.

The CMTS 134 is a device, known in the art, that communicates data to and from cable modems 130 connected to the network 110 via the network 110. In one embodiment, the CMTS 134 is compatible with at least DOCSIS 1.1 standard, which is known in the art. Obviously, in other embodiments, the CMTS 134 may be configured for other communication standards, including other DOCSIS standards. The CMTS 134 facilitates communication between the cable modems 130 and other computers on the Internet 150 via the server network 138. The configuration and operation of a CMTS 134 is known in the art.

The server network 138 is by way of example a LAN/Ethernet network that has attached to it various servers that perform operations necessary to facilitate Internet connections between cable modems 130 on the network 110 and the Internet 150. These servers include, by way of example, a trivial file transfer protocol (TFTP) server 140, a time of day (TOD) server 142, and a dynamic host control protocol (DHCP) server 144. Each of the above servers implements DOCSIS Internet connection functionality. For example, the TFTP server 140 maintains configuration files for each cable modem 130. The configuration file for each cable modem 130 identifies the parameters/constraints of service for the modem 130. Such parameters/constraints are often dictated by a level of service purchased by the subscriber 122 associated with the modem 130. Thus, the parameters may for example define the maximum available bandwidth, the number of customer premise devices that may be attached to the modem 130, etc. The TOD server 142 provides time stamp information on certain communications between the modems 130 and the Internet 150. For example, e-mail messages generated by a modem 130 may be time-stamped using time information from the TOD server 142. The DHCP server 144 provides the IP address assignment for the cable modems 130. In general, as is known in the art, each cable modem 130 requests an Internet Protocol (IP) address when it attempts to establish a connection to the Internet 150. The DHCP server 144 performs the operations to obtain such addresses.

Additional servers 146 on the server network 138 include servers required to provide Voice over Internet Protocol (VoIP) services via the network 110. VoIP services provide telephony via an Internet connection through the cable modems 130 of subscribers. As will be discussed below in further detail, subscribers using such services must include additional equipment connected to the cable modem 130. In particular, a device known as a multimedia terminal adapter (MTA) must be connected between the cable modem 130 and the subscriber telephone. Alternatively, the MTA could be integrated with a cable modem, which is known as an embedded MTA (eMTA). Details regarding VoIP services may be found in McIntosh, David, "Building a PacketCable™ Network: A Comprehensive Design for the Delivery of VoIP Services," (SCTE Cable Tec-Expo® 2002, which may be found at www.cablelabs.com), which is incorporated herein by reference.

The server network 138 further includes a router or switch 148 that connects to the Internet 150. Routers that connect a LAN such as the server network 138 to an Internet access point are well known.

Referring to the network 110 outside of the headend 112, the headend optical encoder/decoder 124 is coupled to a plurality of optical lines of the optical plant 114. While FIG. 1 shows two optical lines emanating from the headend optical encoder/decoder 124, the network 110 may suitably include large number of optical lines in the optical plant 114. The lines of the optical plant 114 extend to various geographical areas and terminate in node optical encoder/decoders 126. Each optical encoder decoder 126 is further connected to downstream coaxial cables of the cable plant 116. Extending from drop points on the cable plant 116 are network tap lines 118. The network tap lines 118 are also constructed of coaxial cable. Extending from each network tap line 118 is one or more subscriber drop line 120. The subscriber drop line 120 provides coaxial cable terminations to a subscriber premise 122. As is known in the art the subscriber premise 122 may be a residence, commercial or industrial establishment.

As discussed above, some subscribers have a television 128 operably connected to the subscriber drop line 120, a cable modem circuit 130 connected to the subscriber drop line 120, or both.

The analysis device 100 is intended to test or analyze aspects of the performance of the network 110 in a variety of locations, particularly those proximate one or more subscriber premises 122. In particular, service providers (i.e. the party that provides communication services via the network 110) often receive notification of trouble in the network 110 through customer complaints. Because the customer can typically only describe visible symptoms of a problem (e.g. cable modem won't connect, slow internet connectivity, fuzzy television picture, etc.), actual diagnosis of the problem often requires testing that is performed at the complaining subscriber's premises.

As shown in FIG. 1, the analysis device 100 may be connected directly to the subscriber coax drop line 120, or may be connected to the drop line 120 through a customer modem 130 via Ethernet or otherwise. As will be discussed below, many of the tests performed by the test device are performed through the direct connection to the subscriber coax drop line.

In general, the communication network 110 delivers broadband RF signals to each subscriber drop line 120 that comprise a number of frequency channels, each channel having a unique carrier frequency. The carrier signal of each frequency is modulated by information, typically an audio-visual baseband signal, provided from the broadcast information source 132. The audio-visual baseband signal may be a standard analog NTSC signal, or a digital television signal.

To this end, the baseband audio-visual baseband information for each broadcast channel is modulated onto a particular channel frequency carrier and then combined with all of the other channel frequency carriers to form a multichannel broadband RF signal. The broadband RF signal provided to the headend optical encoder/decoder 124. The headend optical encoder/decoder 124 converts the broadband RF signal to an optical signal, which then propagates through the fiber plant 114 to the nodes 126. The nodes 126 convert the optical signal back to a broadband RF signal and then provide the broadband RF signal to the lines of the cable plant 116. The cable plant 116, the network tap lines 118 and the subscriber drop lines 120 cooperate to provide the broadband RF signal to each subscriber premise 122. If the subscriber premise 122 has a television 128 operably connected to the drop line 120, then the television 128 may tune and display any of a plurality of audio-visual programs within the broadband RF signal.

A portion of the broadband signal is reserved for downstream and upstream data packet communication. The data packet communication in the embodiment described herein comprises data to be communicated using TCP/IP standards, and which may be communicated to remote computers 152 over the Internet 150. The CMTS 134 effectively transmits downstream data packets to cable modems 130 using known modulation techniques, and receives upstream data packets from the cable modems 130 using known demodulation techniques.

The CMTS 134 prepares upstream packets for transmission over the Internet 150 in accordance with known standards and techniques. The CMTS 134 provides the prepared upstream packets to the router 148, which in turn provides the packets to the Internet 150. The Internet 150 may then provide the data packets to one or more remote computers 152. Such data packets may include electronic mail, http requests, web page information, and any other information normally associated with Internet usage.

Packets of data generated by remote computers 152 may be transmitted to a cable modem 130 of the network using a reverse path. VoIP services also use the same path.

As discussed above, the TFTP server 140, the TOD server 142 and the DHCP server 144 also perform operations in Internet communications via the CMTS 134. As is known in the art, the TFTP server 140 includes a configuration on file that defines constraints on the communication parameters for each modem 130, such as bandwidth limitations or the like. As is also known in the art, the TOD server 142 provides time-stamp information to cable modems 130 for event logging. The DHCP server 144 establishes a dynamic IP address for each modem 130 (and associated MTA's, not shown in FIG. 1) when the modem 130 attempts to connect to the Internet 150 via the CMTS 134.

Figure 2:
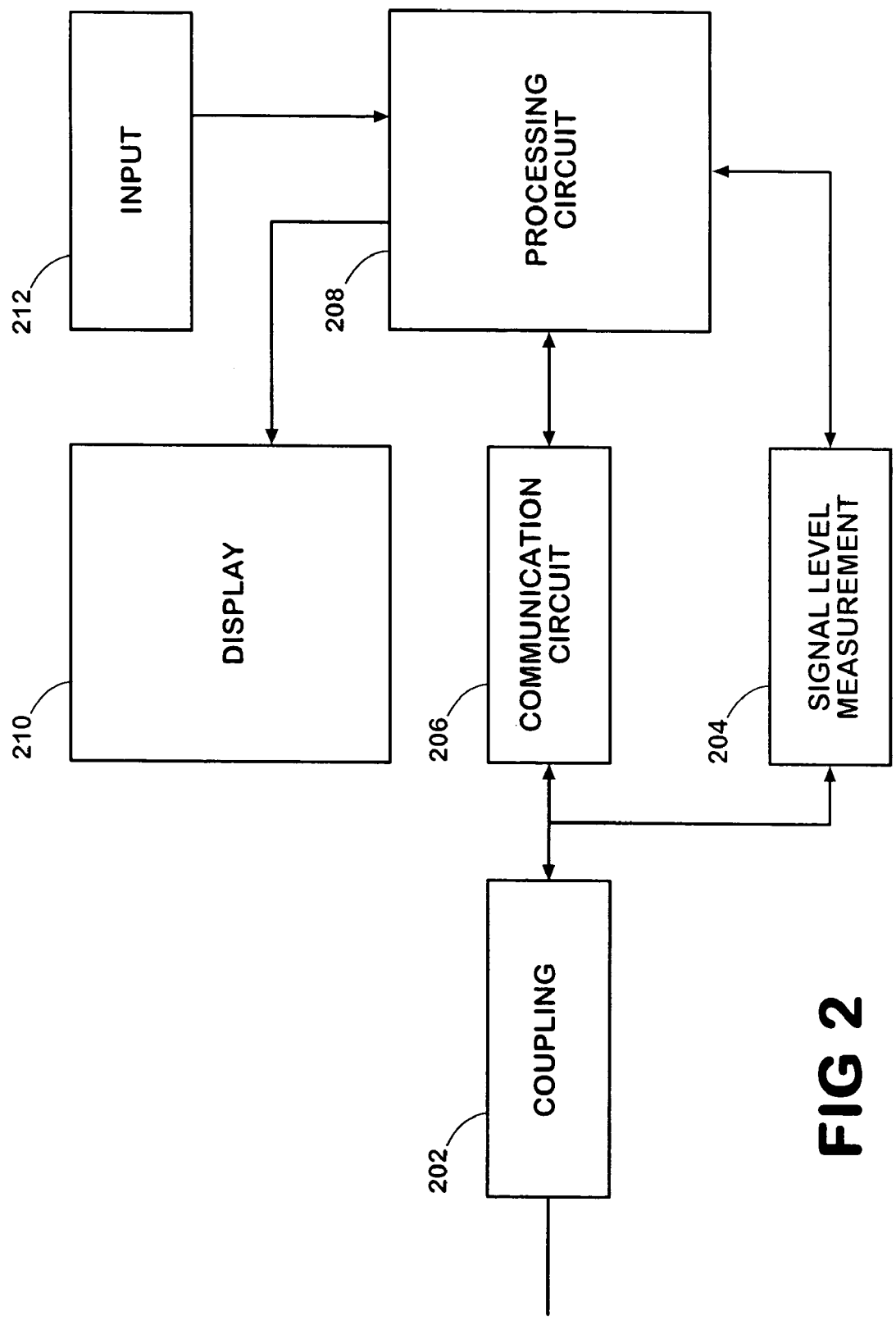
FIG. 2 shows a block diagram of an exemplary test apparatus according to the present invention.

FIG. 2 shows a first embodiment of the analysis device 100 of FIG. 1. The analysis device 100 includes a connector 202, a display 204, a digital communication circuit 206 and a processing circuit 208. The analysis device 100 also preferably includes an input 210 for receiving user input.

The connector 202 is a device configured to connect to a coaxial cable of a communication system where the communication includes a connection to a network that employs internet protocol communications. A nonlimiting example of such a network is the communication network 110 of FIG. 1. Various suitable connectors would be known to those of ordinary skill in the art.

The display 204 is preferably a user-readable display for displaying analysis information. The display 204 may also be employed to illustrate user options or choices. In some embodiments, the display 204 may incorporate touch screen technology to allow input to the device 100 directly through the display 204. In such a case, the display 204 would also comprise a portion of the input 210. The display 204 may suitably be an LCD display, a cathode-ray tube display, a plasma display, or other type of display.

The digital communication circuit 206 is operably connected to the connector 202 and is configured to communicate information signals within the communication system via the connector 202. The digital communication circuit 206 is operable to establish at least two types of connections through the communication system. The first type of data connection employs an internet protocol, while the second type of internet data connection employs a voice over internet protocol. In a preferred embodiment, the first type of communication is a type of communication known as a high speed data connection, and is typically used for communication to other devices over the Internet. To this end, the digital communication circuit 206 includes a cable modem, for example, a modem that operates in accordance with the DOCSIS 1.0, DOCSIS 1.1, or other suitable standard. The second type of connection is known in the art as a VoIP connection. To provide the VoIP connection capability, the digital communication circuit 206 further includes a multimedia terminal adapter, known in the art as an MTA. Further information on VoIP and MTAs is provided further below in connection with FIGS. 3 and 4.

The processing circuit 208 is connected to the digital communication circuit 206. The processing circuit 208 includes one or more processors that are collectively (or individually) operable to obtain first diagnostic data relating to the first type of connection and operable to obtain second diagnostic data relating to the second type of connection. The processing circuit 208 is further operable to cause the display 204 to display information representative of the first diagnostic data and display information representative of the second diagnostic data.

Thus, a single device may be used to analyze aspects related to the quality of service of normal internet high speed cable network connections, as well as aspects related to the quality of VoIP cable network connections.

In one alternative embodiment, the analysis device 100 provides two types of analysis on a VoIP cable network connection. The first type of analysis yields information relating to the actual connection parameters of a data connection in the communication network, for example, IP addresses and/or other configuration information of an established connection. The second type of analysis yields information relating to the performance of a data connection, for example, a measure of the signal quality, noise or data errors.

To this end, the connector 202 is similarly configured to connect to a coaxial cable of a communication system. In the alternative embodiment, however, the communication system under test need only provide a connection to a telephone network, although it may provide connections to other networks including the Internet.

In the alternative embodiment, the digital communication circuit 206 is operably connected to the connector and is configured to communicate information signals within the communication system via the connector 202. The digital communication circuit 206 is also operable to establish a voice over internet protocol data connection through the communication system.

In this second embodiment, the processing circuit 208 is operable to obtain first diagnostic data relating to a set of connection parameters of the established connection and is operable to obtain second diagnostic data relating to the performance of the established connection. The processing circuit 208 is further operable to cause the display 214 to display information representative of the first diagnostic data and display information representative of the second diagnostic data.

The connection parameters may include identification of relevant IP addresses such as the IP address assigned to the digital communication circuit 206 and/or the processing circuit 208 during the establishment of the connection. The connection parameters may include information regarding the channel frequency and/or modulation type assigned to the connection. The performance information may include packet loss, delay and/or jitter information that describe the quality of service based on packets received in or transmitted from the digital communication circuit 206.

Figure 3:
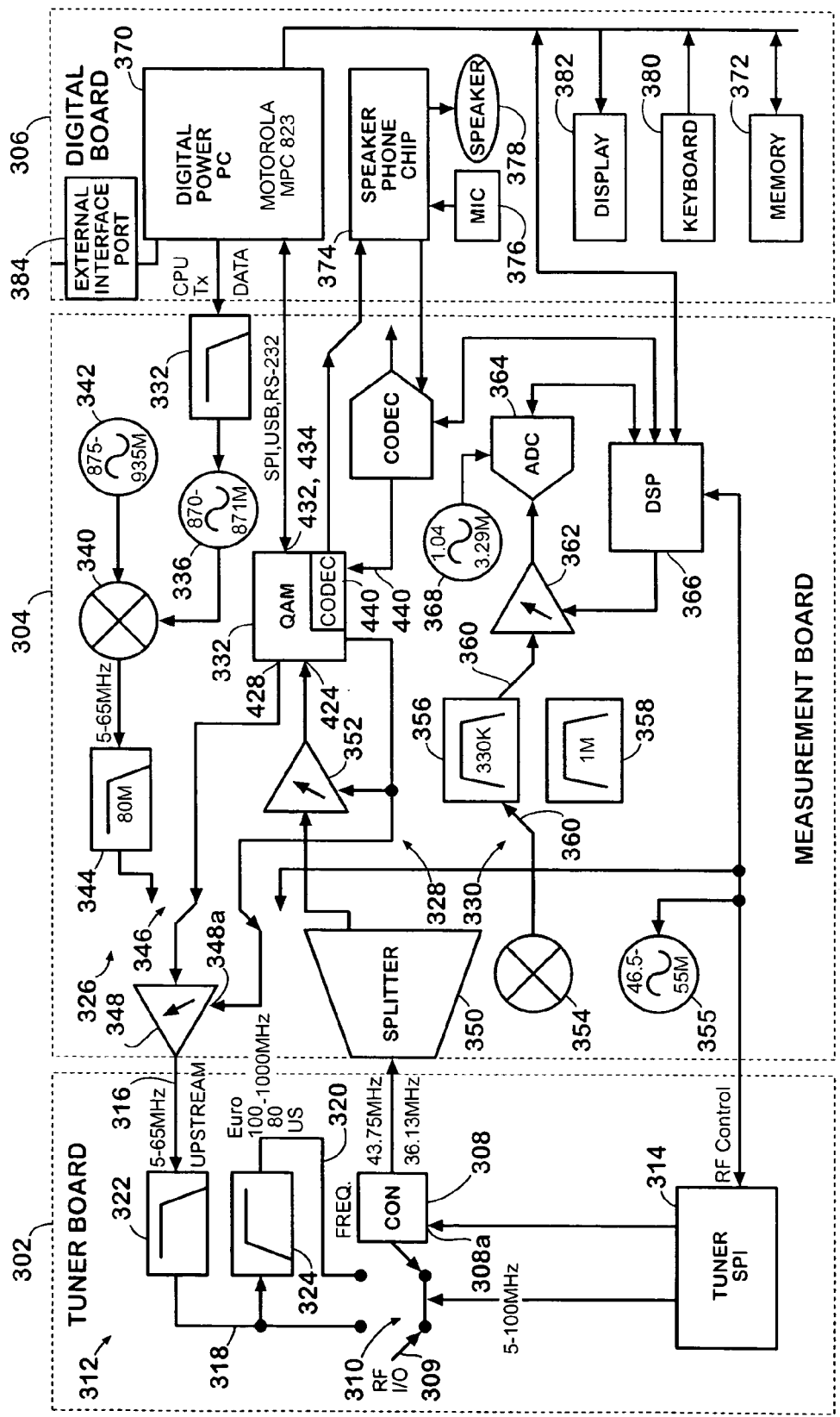
FIG. 3 shows a schematic block diagram of a test apparatus that includes aspects of the present invention.
Figure 3A:
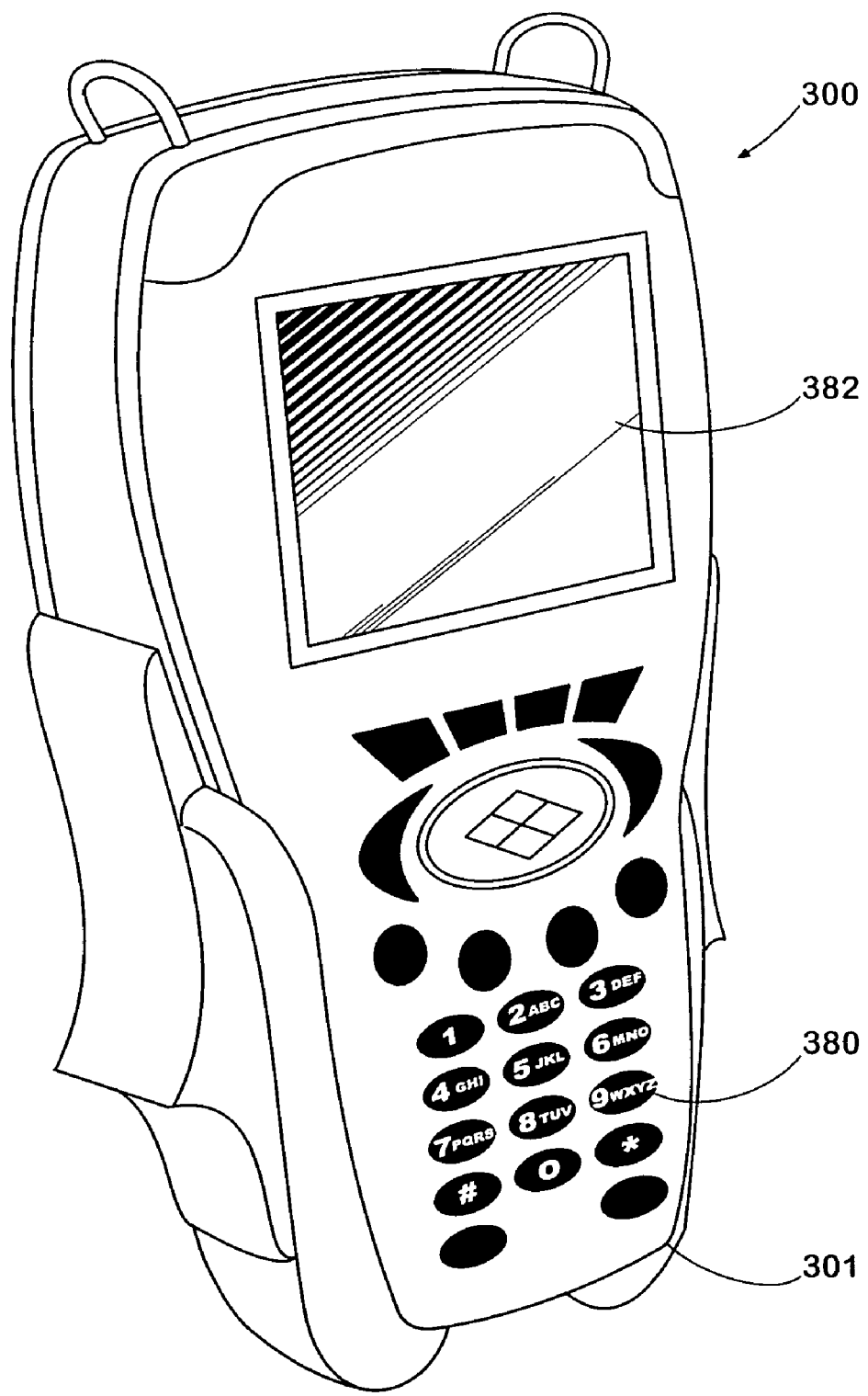
FIG. 3a shows a plan view of the test apparatus of FIG. 3.

FIG. 3 shows in further detail an exemplary embodiment of a test device 300 that includes the functionality of the device 100 of FIG. 2 integrated with other test functions. The additional functions are not necessary in achieving many of the advantages of the invention, but do provide additional features and advantages for certain embodiments. FIG. 3a shows a plan diagram of the external appearance of the exemplary device of FIG. 3. In the embodiment described herein, all of the elements described below as being a part of the device 300 is supported in the handheld housing 301 shown in FIG. 3a.

As shown in FIG. 3, the device 300 is roughly divided into a tuner circuit 302, a measurement circuit 304, and a control/interface circuit 306. The tuner circuit 302 is a circuit that, in general, obtains a select RF channel frequency that contains either analog broadcast information, digital broadcast information, and/or internet protocol data packets. The measurement board 304 is a board that performs a plurality of measurement operations on the select RF channel frequency. The control/interface circuit 306 presents the results of the measurement operations to a display, and further allows a user to select which of the plurality of measurement operations the user desires the device 300 to perform. In the exemplary embodiment described herein, the control/interface circuit 306 further allows the user to obtain and display Internet web pages.

The tuner circuit includes a frequency conversion circuit 308, an input 309, an RF switch 310, a diplexer 312 and a control interface 314. The frequency conversion circuit 308 is a circuit that converts the frequency of an incoming broadband signal such that a select channel frequency of between 4 and 1000 MHz is centered about a predetermined intermediate frequency (IF). In U.S. applications, the predetermined IF is preferably 43.75 MHz. In European applications, the predetermined IF is preferably 36.13 MHz. Suitable frequency conversion circuits are well known. A typical frequency conversion circuit will including among other things, two mixers and two local oscillators, not shown configured in a manner well known in the art. The frequency conversion input 308 includes a control input 308a that receives control signals that identify the frequency band that is to be centered about the IF.

The RF input 309 is operably connectable to a termination of an HFC network, preferably a coaxial cable termination of a communication network. Thus, for example, the RF input 309 would connect to the subscriber drop line 120 of FIG. 1. The RF input 309 is operable to receive broadband RF signals having a broadband spectrum of at least between 5 MHz and 1000 MHz.

The diplexer 312 is a circuit that is operable to provide bidirectional signals on the same signal line 318 to and from the RF input 309. The bidirectional signals include upstream signals generated within the device 300 and downstream signals received from the RF input 309. The diplexer 312 includes an upstream input 316, a shared signal line 318, a downstream output 320, an upstream filter 322 and a downstream filter 324. The upstream input 316 is coupled to an output amplifier 348 of the measurement circuit 304, discussed further below, from which it receives upstream RF signals that include data packets. The upstream input 316 is further connected to the upstream filter 322.

The upstream filter 322 and the downstream filter 324 are configured to have non-overlapping passbands, the upstream filter 322 having a passband that includes the RF frequency band of all upstream digital data packet channels and the downstream filter 324 having a passband that includes the RF frequency band of all downstream digital data packet channels. In accordance with CableLabs and tComLabs standards for HFC networks, the upstream filter 322 is configured to pass RF signals within the frequency band of 5 MHz to 42 MHz for Docsis and 5 MHz to 65 MHz for Euro Docsis, while blocking RF signals within the frequency band of about 88 MHz or 108 to 860 or 862 MHz. Similarly, the downstream filter 324 is configured to pass RF signals within the frequency band 88 MHz to 860 MHz (108 MHz to 862 MHz in Europe) and block signals within the band of approximately 5 MHz and 42 or 65 MHz.

To accomplish the foregoing, it will be appreciated that the upstream filter 322 may suitably be a low pass filter with a cut-off frequency in the vicinity of about 55-70 MHz, and the downstream filter 324 may be high pass filter with a cut-off frequency in the vicinity of 75-80 MHz.

In any event, the upstream filter 322 is disposed between the shared signal line 318 and the upstream input 316. The RF switch 310 is preferably a double pole, double throw switch that has a first position and a second position. In the first position, the RF switch 310 connects the RF input 309 directly to the frequency conversion circuit 308. In the second position, the RF switch 310 connects the RF input 309 to the shared signal line 318, and connects the downstream output 320 to the frequency conversion circuit 308.

The control interface 314 is an interface circuit, such as a serial/parallel interface (SPI) circuit that receives control signals relating to the operation of the tuning circuit 302 and includes the logic to provide the signals to the controlled devices within the tuning circuit 302. In general, the control interface 314 receives signals that control the frequency conversion circuit 308 and the RF switch 310. Responsive to such signals, the control interface 314 provides signals to the control input 308a that causes the frequency conversion circuit 308 to tune to a specified frequency channel, and/or causes the RF switch 310 to be in a select one of the first and second positions. In the embodiment described herein, the control interface 314 is operably connected to receive control signals from the SLM digital signal processor 366 of the measurement circuit 304, discussed further below.

The measurement circuit 304 is a circuit that performs or at least plays a significant role in the measurement operations of the device 300. In the embodiment of FIG. 3, the measurement circuit 304 performs analog television signal level measurement, digital signal level measurement, MER, BER measurements, Docsis measurements and cooperates with the control processor 370 of the control/interface circuit 306 to perform throughput and packet loss measurements. It will be appreciated that the measurement circuit 304 (alone or in combination with other circuits) may be configured to perform a different set of tests that includes at least some of the above mentioned tests, as well as others.

The measurement circuit 304 is further roughly divided into three circuits, some of which share components. In particular, the measurement circuit 304 includes a digital transmission circuit 326, a digital measurement circuit 328 and a signal level measurement circuit 330. In general, the digital transmission circuit 326 is operable to generate upstream RF signals for transmission onto the network attached to the RF input 309, the digital measurement circuit 328 is operable to receive RF signals modulated by digital baseband signals and perform various channel quality tests thereon, and the signal level measurement circuit 330 is operable to obtain a measurement of the strength of the received signal, regardless of whether it is modulated with digital information or analog information. In addition to tests performed within the digital measurement circuit 328 and the signal level measurement circuit 330, the digital transmission circuit 326 and the digital measurement circuit 328 cooperate to communicate digital data packets between the network under test and the processor 370 of the control/interface circuit 306. The processor 370 may use digital packet communication (e.g. Ethernet packets) in the performance of additional tests or measurements.

The digital transmission circuit 326 includes dual output paths. The first path is a modem circuit 332 that is connected to receive, among other things, data to be transmitted from the control processor 370, the SLM DSP 366, and a microphone 376 in the control/interface circuit 306. The first path is generally used for DOCSIS and VoIP testing, discussed further below.

The second path is a frequency modulation circuit that includes a first filter 334, a first oscillator 336, a mixer 340, a second oscillator 342, and an output filter 344. The second path may be used to communicate telemetry and other communication signals from the control processor 370 to a device connected to the network under test. As will be discussed below, telemetry signals may be used to communicate details regarding SLM measurements performed on analog or digital channel frequencies.

Referring specifically to the second output path, the first filter 334 is connected to receive data to be transmitted form the control processor 370, and is further connected to an input of the first oscillator 336. The output of the oscillator 336 is connected to one input of the mixer 340, and the output of the second oscillator 342 is connected to the other input of the mixer 340. The output of the mixer is provided to the output filter 344.

The outputs of the output filter 344 and the modem circuit 332 are connected to selectable inputs of an output RF switch 346. The RF switch 346 is controllable to provide a select connection to either the output filter 344 or the modem circuit 332. The output of the RF switch 346 is connected to a signal input of the output amplifier 348. The output amplifier 348 includes a control input 348a connected to the modem circuit 332. The control input 348a is used to adjust the amplification level provided by the output amplifier 348.

The first oscillator 336 in the embodiment described herein has an output frequency of between 870 and 871 MHz, dependent upon the signal received from the control processor 370 (or DSP 366). Thus, the output of the first oscillator 336 is a frequency modulated signal centered about approximately 870.5 MHz. The second oscillator 342 provides a select carrier frequency signal of between 875.5 to 935.5 MHz. The output frequency of the second oscillator 342 may suitably be controlled by the control processor 370 or the DSP 366. The mixer 340 receives and mixes signals from the second oscillator 342 and the first oscillator 336 to produce, among other things, a beat product that is the frequency modulated signal centered around a carrier frequency of between 5 and 65

MHz, depending on the output frequency of the second oscillator 342. The output filter 344 removes high frequency components of the mixed signal and provides the output FM signal to the switch 346.

Referring to the first output path, the modem circuit 332 employs QPSK or QAM to modulate digital information onto RF signals having a carrier frequency of between 5 and 65 MHz. To this end, the modem circuit 332 includes a DOCSIS1.1 modem. A suitable modem circuit 332 is the BCM3352 integrated circuit available from Broadcom. FIG. 4 shows an exemplary embodiment of the modem circuit 332. FIG. 4 shows the general architecture of a modem circuit that can carry out the various operations ascribed to the modem circuit 332. The modem circuit 332 of FIG. 4 is based on the Broadcom BCM3352 architecture, but has some minor modifications to carry out the processes described herein. Further detailed information regarding the architecture of the BCM3352 may be obtained through the Reference Design of the BCM3352 available from Broadcom Corporation of Irvine, Calif. The minor modifications occur in the software of the CPU of the BCM3352, which is readily accomplished with the Reference Design of the BCM3352.

In general, however, the modem circuit 332 includes a DOCSIS modem 402, a multimedia terminal adapter (MTA) 404, a codec 406, a central processing unit (CPU) 408, a QAM receiver 410, a QAM transmitter 412, an external bus interface 414, an internal bus 416, a USB transceiver 418, an RS-232 transceiver 420 and an SDRAM controller 422. All of the above elements may suitably be integrated onto a single semiconductor platform. The connections to the modem circuit 332 include an IF input 424 connected to the QAM receiver 410, a receiver control output 426 connected to the QAM receiver 410, an RF output 428 and a transmitter control output 430 connected to the QAM transmitter 412, control/test data outputs 432 and 434 connected to the USB transceiver 418 and the RS-232 transceiver 420, respectively.

The QAM receiver 410, the QAM transmitter 412, the CPU 408, the DOCSIS modem 402, the MTA 404, the USB transceiver 418, the RS-232 interface 420 and the external bus interface 414 are all connected via the internal bus 416. A direct connection between the DOCSIS modem 402 and each of the QAM receiver 410 and the QAM transmitter 412 is also provided. The codec 406 is connected to the MTA 404, and is further connected to the voice I/O 436 of the modem circuit 332.

The DOCSIS modem 402 is a cable modem device, multiple suitable designs of which are well known in the art. The DOCSIS modem 402 effectively receives and generates Internet protocol data packets received (or to be transmitted) over an HFC or other cable network. As is known in the art, the DOCSIS modem 402 enables the logical connection to the Internet through a standard cable modem termination system (e.g. the CMTS 134 of FIG. 1).

The MTA 404 is a circuit that enables telephony using Internet protocols. To this end, the MTA 404 preferably includes a digital signal processing (DSP) circuit. Regardless, the MTA 404 is configured to communicate special VoIP data packets through the DOCSIS modem 402. In operation, the MTA 404 establishes a network connection to the other servers connected to the HFC network that provide VoIP telephony service. In this network connection, the MTA 404 obtains its own IP address, as is known in the art. Details regarding the functionality of the MTA 404 that should be programmed into the DSP that is used as the MTA 404 are provided in specifications known in the art and available at www.cablelabs.com. (See McIntosh, David, "Building a PacketCable™ Network: A Comprehensive Design for the Delivery of VoIP Services," SCTE Cable Tec-Expo® 2002, which may be found at www.cablelabs.com, and references cited therein, which is incorporated herein by reference.

The codec 406 is a device that converts digital voice data to analog voice signals and vice versa. The codec 406 is connected to receive digital voice data from the MTA and to provided digital voice data thereto. The codec 406 is further operable to receive analog voice signals from, and provide analog voice signals to a telephone I/O port 440.

The CPU 408 is a high speed processing circuit that controls the operations of the modem circuit 332. The CPU 408 is operable to obtain information from and provide control information to the DOCSIS modem 402, the MTA 404, the QAM receiver 410 and the QAM transmitter 412. The CPU 408 is operable to exchange data with external components via the ports 432 and 434 via the USB transceiver 418 and the RS-232 transceiver 420. The Broadcom BCM3352 Reference Design, available from Broadcom Corporation, includes source code for the CPU 408 that may be modified to adjust the operations of the various elements of the modem circuit 332. As will be discussed below, certain data obtained within the CPU 408 may be used in the performance of one or more system diagnostic tests.

The external bus interface (EBI) 414 provides an interface to an external bus on which may connected program flash memory 442. The program flash memory 442 is used to store program code for the CPU 408.

The QAM receiver 410 is a device that is operable to receive QAM modulated signals, including 64-QAM and 256-QAM. The QAM receiver 410 receives such signals from the IF input 424 and provides the demodulated digital signal stream to other elements of the modem circuit 332 under the control of the CPU 408. By way of example, ordinary Internet packet data (i.e. electronic mail, web page data, etc.) as well as VoIP data may be provided to the DOCSIS modem 402 over the bus 416. The CPU 408 may from time to time obtain data from the QAM receiver 410.

QAM receivers are known in the art, and typically include an adaptive equalizer routine or function that corrects for certain types of line noise. Information from an adaptive equalizer of a QAM receiver 410, as well as other information, may be used by the CPU 408 to determine the bit error rate (BER) or modulation error rate (MER), sometimes called the cluster variance, of the incoming QAM signal. Techniques of determining MER and BER from information readily available in a QAM receiver are discussed in U.S. Pat. No. 6,233,274 Tsui et al, which is incorporated herein by reference. In addition, MER and BER information may readily be obtained from the BCM3352, and would be readily apparent to one of ordinary skill in the art having the Reference Design.

The QAM transmitter 412 is a device that is operable to receive digital data packets and modulate the packets onto RF carrier signals. The RF carrier signals have any of a plurality of frequencies within the upstream RF signal band for the HFC network to which the device 300 of FIG. 3 is connected. Currently, HFC networks in the United States reserve certain frequencies within the 5 to 42 MHz range for upstream digital signals. In Europe, upstream signals may be in the 5 to 65 MHz range. The QAM transmitter 412 in the embodiment described herein is operable to modulate received digital packets using QPSK or QAM-16 modulation. The type of modulation and the carrier frequency used by the QAM transmitter 412 are typically controlled by the CPU 402, the DOCSIS modem 402, or a combination of both.

Referring again generally to FIG. 3, the output path through the modem circuit 332 is generally used to transmit packet data that is intended for the Internet or a similar type network. The modem circuit 332 may be used to convert voice data received to from the control/interface circuit 306 to packet data for transmission using VoIP protocols. The modem circuit 332 may also be used to convert digital information generated by the control processor 370 to packet data for transmission using other Internet standard protocols.

The receiver circuit 328 and the signal level measurement circuit 330 are both connected to the frequency conversion circuit 308 of the tuner circuit 302 through a splitter 350. The receiver circuit 328 includes a gain adjustment amplifier 352 and the modem circuit 332. The modem circuit 332 is operable to receive Internet protocol packets (VoIP or otherwise) and provide output to various devices on the control/interface circuit 306. In one mode (VoIP mode), the modem circuit receives VoIP protocol data packets and provides analog voice signals to the speaker phone chip 374 of the control/interface circuit 306. In another mode, the modem circuit receives IP data packets and provides the packets to the control processor 370 of the control/interface circuit 306. In still another mode, the modem circuit 332 provides BER, MER, packet loss, delay (latency) and jitter information to the control processor 370, as will be discussed further below. Thus the modem circuit 332 enables reception of VoIP packets, the reception of other non-VoIP Internet data packets, and the performance of various measurements, including BER, MER, packet loss, delay and jitter measurements.

The signal level measurement circuit 330 includes an SLM mixer 354, an SLM oscillator 355, a first measurement filter 356, a second measurement filter 358, a filter switch 360, a gain control amplifier 362, an analog to digital converter (ADC) 364, a digital signal processor (DSP) 366, and a variable ADC clock circuit 368.

The SLM mixer 354 and SLM oscillator 355 cooperate to further convert in incoming IF signal such that a frequency band of interest is centered around a particular measurement IF. While the frequency conversion circuit 308 of the tuner circuit 302 is configured to convert the broadband signal such that a particular channel is centered around an IF frequency, the SLM mixer 354 and SLM oscillator 355 convert the signal such that a particular 330 kHz band of the channel signal is centered around a select IF.

The filter switch 360 effectively routs the measurement IF signal to one of the first filter 356 and the second filter 358. For the measurements discussed herein, the filter switch 360 typically routes the measurement IF signal through the first filter 356. The first filter 356 is a 330 kHz band pass filter centered at the center of the measurement IF band. Thus, the first filter 356 produces an output signal that is 330 kHz wide, which constitutes a select portion of the channel selected by the tuner circuit 302.

The gain adjustment amplifier 362 is configured to provide a variable amount of gain to the filtered IF signal produced by the first filter 356. The gain adjustment amplifier 362 includes a control input 362a in which it receives a gain control signal from the DSP 366, as discussed further below. The gain adjustment amplifier 362 is operably connected to provide its output signal to the ADC 364. The ADC 364 is operable to generate digital samples of the filtered and gain adjusted IF signal and provide those samples to the DSP 366. Such ADCs are known. The ADC 364 should be able to sample at rates between 1.04 and 3.29 million of samples per second. The ADC clocking circuit 368 provides the clock signal that controls the sampling rate of the ADC 364 based on the input signal being sampled. The ADC clocking circuit 368, controlled by the DSP 366 and/or the control processor 370, is adjustable so that the highest sampling rate is used primarily only when needed, for example, because of the resolution required by the particular test. A lower resolution is used otherwise in order to conserve system resources.

The DSP 366 is operable to generate measurement information from a number of digital samples received from the ADC 364. The DSP 366 performs a different measurement information generating procedure dependent upon whether the received channel is a digital information channel or an analog signal channel. The DSP 366 further controls the operations of the tuner 302, the SLM oscillator 355 and the gain adjustment amplifier 362.

The DSP 366 controls the tuner 302 to provide the controls the select the channel to be "tuned to", or in other words, the channel frequency that will be converted by the frequency conversion circuit 308 to be centered around the IF. The DSP 366 controls the SLM oscillator 355 to select the portion of the channel that will be measured. In particular, to obtain signal level measurements on a digital channel, several 330 kHz bands of the channel are measured, and then the overall signal level of the channel may be estimated. Further detail regarding such a measurement is provided further below.

The DSP 366 controls the gain adjustment amplifier 362 such that the samples provided to the ADC 364 are within a desired quantization range of the ADC 364. In particular, low magnitude signals receive more gain than high magnitude signals, such that the analog signal provide to the ADC 364 is roughly normalized to be within the preferred operating range of the ADC 364. The DSP 366 uses the amplification value in the calculation of the signal level measurement.

The DSP 366 is operable to receive control signals from the control processor 370 that direct the DSP 366 as to which measurement task to perform. For each measurement task, the DSP 366 performs an associated set of operations. In the embodiment described herein, the DSP 366 has different sets of operations for performing, among other things, a single analog channel SLM, a single digital channel SLM, and a multi-channel sweep SLM. The DSP 366 further generates control signals for various elements in the measurement circuit 304 as well as the tuner circuit 302, as is described throughout.

Referring now to the control/interface circuit 306, the control/interface circuit 306 is generally operable to allow a technician to select from a plurality of measurement operations, and further provides human perceptible output derived from the measurement operations. To this end, the control/interface circuit 302 in the embodiment described herein includes a control processor 370, a memory 372, a speaker phone circuit 374, a microphone 376, a speaker 378, a keypad 380, a display 382 and an external interface port 384.

The control processor 370 is a processing circuit that includes a microprocessor, digital signal processor, microcontroller, or other processing circuit operable to carry out the operations described herein. In the embodiment described herein, the control processor 370 may suitably include a model PowerPC microprocessor, available from Motorola Corporation. Regardless of the form of the processing circuit, the control processor 370 is operably connected to each of the memory 372, the keypad 380, the display 382, the external interface port 384, modem circuit 332, and the DSP 366. The control processor 370 is operable to perform the operations attributed to it in this description, particularly as discussed further below in connection with FIGS. 4-11.

The memory 372 may suitably be a combination of random access memory (RAM), programmable read-only memory (PROM), flash memory, etc. The memory 372 contains the program code executed by the control processor 370, and may be used to store user preferences, to store test measurement results, and for local calculations.

The display 382 is a device operable to display measurement results, and is further operable to display web pages received via the receiver circuit 328 from the external HFC. To this end, the controller processor 370 includes a light client interface, for example a web browser, that is operable to receive graphic data files that include a mark-up language rendering instructions, such as HTML, XML or other mark-up language, and interpret the mark-up language in the graphic data files to provide a display based thereon. As is known in the art, a mark-up language is a machine independent data presentation protocol that allows graphics (including text) to be rendered in a similar manner on a variety of displays and a variety of platforms. Thus, the control processor 370 employs a web browser (or other light client interface) to interpret received graphic files and cause the files to be rendered in a coherent manner on the display 382.

To facilitate ease of use in a handheld device, the display 382 is preferably a relatively small display, less than about sixteen square inches. At present, the display 382 is preferably an LCD display having 320×240 pixels, and has a diagonal dimension of 3.8 inches. LCD displays balance the needs of compactness, cost-efficiency and power efficiency.

The keypad 380 may be an alphanumeric keypad, or other collection of pushbutton actuators in which numbers and/or letters may be entered. (See, for example, FIG. 3a). The keypad 380 preferably includes arrow keys (for moving a cursor or selecting from displayed items). In some cases, a combination of specialized function keys and arrow keys will be sufficient. In general, the keypad 380 at a minimum allows the user to select from a plurality of tests to be performed. The keypad 380 preferably also includes at least numeric keys will allow the entry of particular channel or frequency numbers at which measurements are to be taken. See FIG. 2 for an exemplary layout of the keypad 380. The external interface port 384 of the device 300 may be used for local and remote communications through the processing circuit 370.

The speaker phone chip 374 performs audio duplexing, feedback suppression, amplification and other operations normally associated with speaker-telephones. The speaker phone chip 374, which is suitably an MC34018DW integrated circuit package available from Motorola Corporation, is operable to receive analog audio signals from the modem circuit 332 and provide amplified analog signals to the speaker 378. The speaker phone chip 374 is further operable to bias the microphone 376 and receive microphone signals therefrom. The speaker phone chip 374 is operable to provide the microphone signals to the modem circuit 332.

The operations of the control processor 370 are described below in connection with various operations of the device 300. In general, the user may select, via the keypad 380, one of a number of operations, including but not limited to, analog channel SLM, digital channel SLM, analog channel sweep, digital channel sweep, analog channel sweep, digital channel MER/BER quality measurements, HFC system throughput and ping testing, and VoIP delay, packet loss and jitter testing. Each of these operations is described below in further detail.

Analog Channel SLM (Video)

A first operation of the device 300 is analog channel SLM. In particular, one measure of HFC systems such as the system 110 of FIG. 1 is the signal level of analog television signals received at customer premises. Analog channel SLM is useful in evaluating new analog cable service to a subscriber, or to troubleshoot problems on existing analog cable service. The user may select to measure a particular channel by selecting the analog channel signal level measurement option via the display 382 and/or keypad 380, and then selecting the channel to be measured by either entering the channel number or the frequency number.

Figure 5:
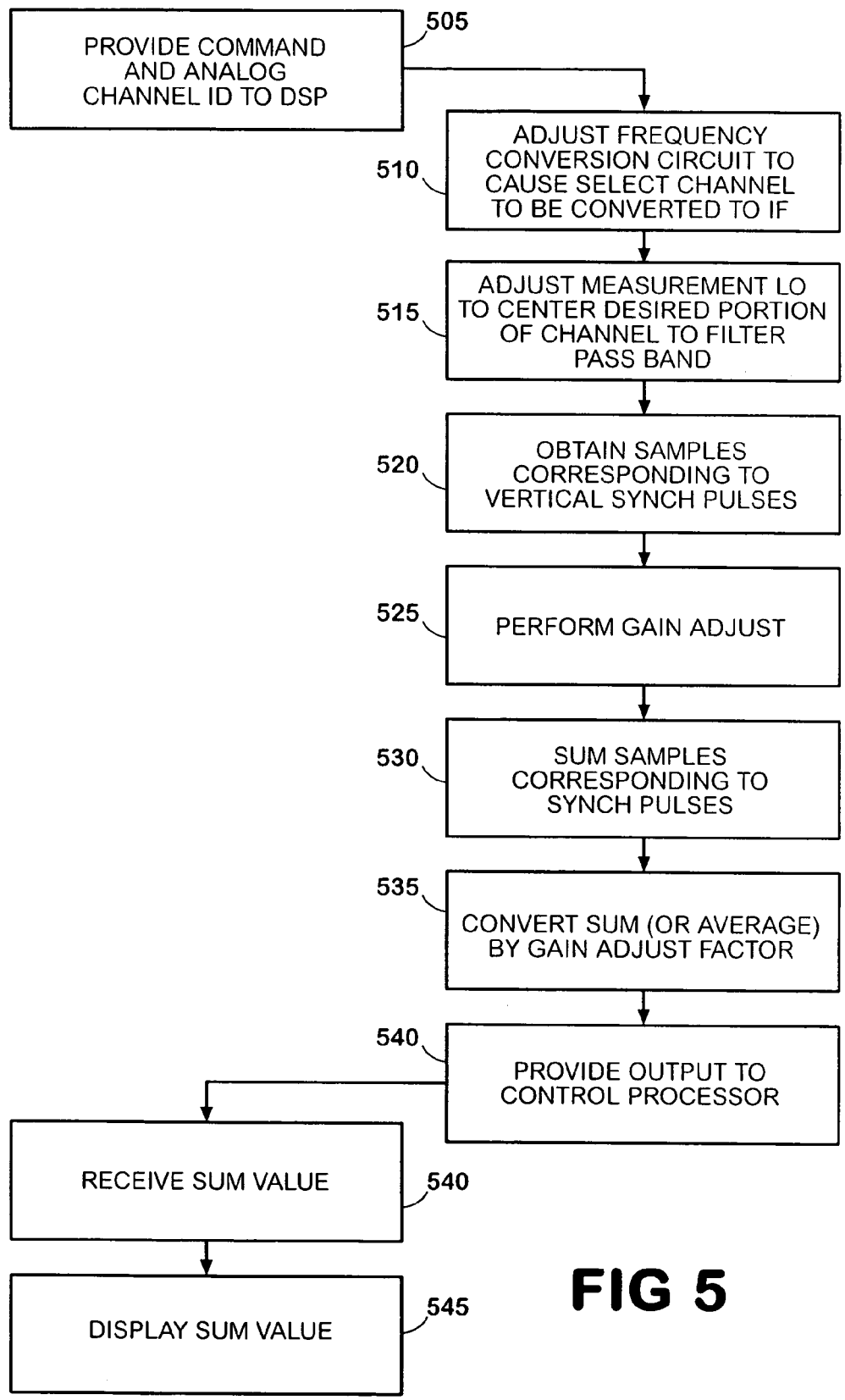
FIG. 5 shows a flow diagram of an exemplary set of operations that may be carried out within the test apparatus of FIG. 3 to carry out analog signal level measurements.

FIG. 5 shows an exemplary set of operations performed by various processing elements in the measurement device 300 of FIG. 3 in order to perform a signal level measurement on a channel N having a channel frequency $f_N$.

Referring to FIGS. 3 and 5 together, the control processor 370 first provides an analog channel SLM command and a channel identification value to the DSP 366 in step 505. The channel identification value corresponds to the channel N and/or channel frequency $f_N$ to be measured. The analog channel SLM command corresponds to a request to perform an analog channel signal level measurement on the channel N.

In step 510, the DSP 366 provides to the control interface 314 of the tuner circuit 302 a tuning control signal that corresponds to the channel N. The control interface 314 provides appropriate control signals to the frequency conversion circuit 308 to cause the frequency conversion circuit to tune to the channel frequency $f_N$. Typically, such a signal is a signal that causes a local oscillator within the frequency conversion circuit 308 to provide a particular LO frequency corresponding to the channel frequency $f_N$. Other known methods may be used. The DSP 366 may further provide a control signal to the control interface that causes the switch 310 to provide a direct connection between the input 309 and the frequency conversion circuit 308.

Responsive to these signals, the frequency conversion circuit 308 receives broadband signals from the input 309, which is connected to the broadband land-based network (e.g. an HFC network such as the network 110 of FIG. 1). The frequency conversion circuit 308 converts the signal such that the channel frequency $f_N$ is centered around the IF of the tuner circuit 302. The frequency converted input signal propagates to the splitter 350 of the measurement circuit 304. The splitter 350 provides the IF signal to the measurement mixer 354.

Contemporaneously, in step 515, the DSP 366 provides a signal to the measurement LO 355 that causes the measurement LO 355 to generate a predetermined LO frequency $f_{ANLO}$ that is used for analog channel measurement. The frequency $f_{ANLO}$, when mixed with the IF signal, operates to convert the IF signal such that a desired frequency subband of the desired channel is centered about 10.7 MHz, which is the center frequency of the measurement filter 356.

Responsive to the control signal received from the DSP 366 in step 515, the measurement LO 355 provides an oscillator signal having the frequency $f_{ANLO}$ to the measurement mixer 354. The measurement mixer 354 mixes the converted broadband input signal with the oscillator signal to generate a new converted signal in which the desired portion of the channel N is centered around 10.7 MHz. The IF filter 356 filters the new converted signal to produce an IF signal containing substantially only the desired portion (approximately 330 kHz signal band) of the channel N. The remaining portions of the converted broadband input signal are largely filtered out.

The 330 kHz portion of the 6 MHz channel signal is chosen such that the portion of the television signal that is used for signal level measurement is preserved. For measuring the video portion of the 6 MHz channel signal, the synchronization pulses are preserved. As a consequence, the 330 kHz portion of the 6 MHz channel that is passed by the filter 356 preserves much or all of the synchronization pulse information.

In particular, for analog television signals, signal level measurements are preferably made by measuring the magnitude of the pulses within the vertical blanking interval of a standard television signal. Because the measurement filter 356 has a 330 kHz pass band, the desired portion of the channel N to be measured for analog signals should be within the 330 kHz band of the 6 MHz (US) or 8 MHz (Europe) channel N in which the pulses of the vertical blanking interval are readily detected. As is known in the art, such 330 kHz frequency band would be relatively low within the 6 MHz channel band.

In any event, the filtered IF signal propagates from the filter 356 to the gain adjustment amplifier 362. The gain adjustment amplifier 362 provides a predetermined amount of initial gain to the IF signal. The ADC 364 receives the gain-adjusted 10.7 MHz IF signal from the amplifier 362 and samples the IF signal, using a sampling frequency of between 1 and 3.29 million samples/sec. The ADC 364 provides the sampled IF signal to the DSP 366.

The DSP 366 in the subsequent steps obtains a signal level measurement using pulses that correspond to the synchronization pulse portions of the received IF signal. In particular, as discussed above, the channel N contains an analog television signal having standard analog television signal components. As is known in the art, each television frame, or momentary screen shot, is comprises of two fields, each field having a set of lines. At the end of each field is a control portion of the standard television signal known as the vertical blanking interval. The vertical blanking interval includes, among other things, field synchronization pulses. These pulses are typically used in measuring an analog signal channel because the magnitude of the pulses is not dependent on the video program content. In other words, ideally, the field synchronization pulses of every analog television signal are of the same magnitude. Thus, measurement of those pulses provides relative indication of signal strength.

Thus, the DSP 366 in step 520 obtains the synchronization pulses within the vertical interval of the television signal on channel N using the received sampled IF. Identification of the synchronization pulses may involve determining the largest magnitude samples that form a repeating pattern that corresponds to the field frequency of the television signal. The DSP 366 may employ any of a number of synchronization pulse identification techniques known in the art.

It is noted, however, that one method of obtaining the equivalent of the synchronization pulses is to simply obtain the maximum values from the baseband signal. Because the maximum sample values will typically be those that correspond to the synchronization pulses anyway, they provide an accurate and reliable measure of signal level of an analog television signal without the necessity of performing timing correlation. Thus, at a minimum, the DSP 366 performs full wave rectification of the input pulses and then obtains the maximum values. The maximum values will normally correspond to the synchronization pulse portions of the analog television signal.

Thereafter, in step 530, the DSP 366 sums the samples corresponding to the synchronization pulses of the vertical interval in order to obtain an average or sum of several of such pulses. The number of synchronization pulse (or maximum value) samples that are summed or averaged correspond to a dwell time, which identifies the duration of the measurement of the channel. The dwell time should be relatively short, as far as human perception goes (i.e. less than a few seconds) but enough to provide an adequate statistical sample, for example, at least long enough to obtain samples corresponding to a few vertical intervals.

In step 535, the DSP 366 converts the summed synchronization pulse samples to a number in standard output units. To this end, the DSP 366 scales the summed sample value by a factor dictated by gain factor used by the gain adjustment amplifier 362 to scale the IF signal. The final value constitutes the signal level measurement value that is passed to the control processor 370 in step 540. In step 545, the control processor 370 causes information representative of the signal level measurement value to be displayed on the display 382. The signal level measurement value may be displayed graphically, textually, or a combination of both.

It is noted that analog television signals also have an audio carrier that is within the 6 MHz band. An SLM measurement may be carried out on the audio carrier of any channel by employing the LO 355 to convert the input IF signal such that the audio carrier is centered over 10.7 MHz. Then the DSP 366 may simply obtain a sum of samples of the audio signal as a signal level measurement.

Digital Signal Level Measurement

Another operation of the device 300 is digital channel SLM. In particular, one measure of HFC system operation is the signal level of digital television signals, or even digital data signals such as those that carry Internet data packets. As with new or existing analog service, it is useful to perform digital channel SLM for digital cable service. For new service, the measurements ensure the quality of the physical plant signal path to each customer. For existing service, the measurements may be used to troubleshoot problems on a particular channel or set of channels.

To perform a measurement, the device 300 is connected to a customer drop line (such as drop line 120 of FIG. 1), or within the actual premises of the customer. To connect the device, a technician couples the input 309 to a coaxial cable termination in the HFC or cable system. The technician may then select to measure a particular channel by selecting the digital channel signal level measurement option via the display 382 and keypad 380, and then selecting the channel to be measured by either entering the channel number or the frequency number.

Figure 6:
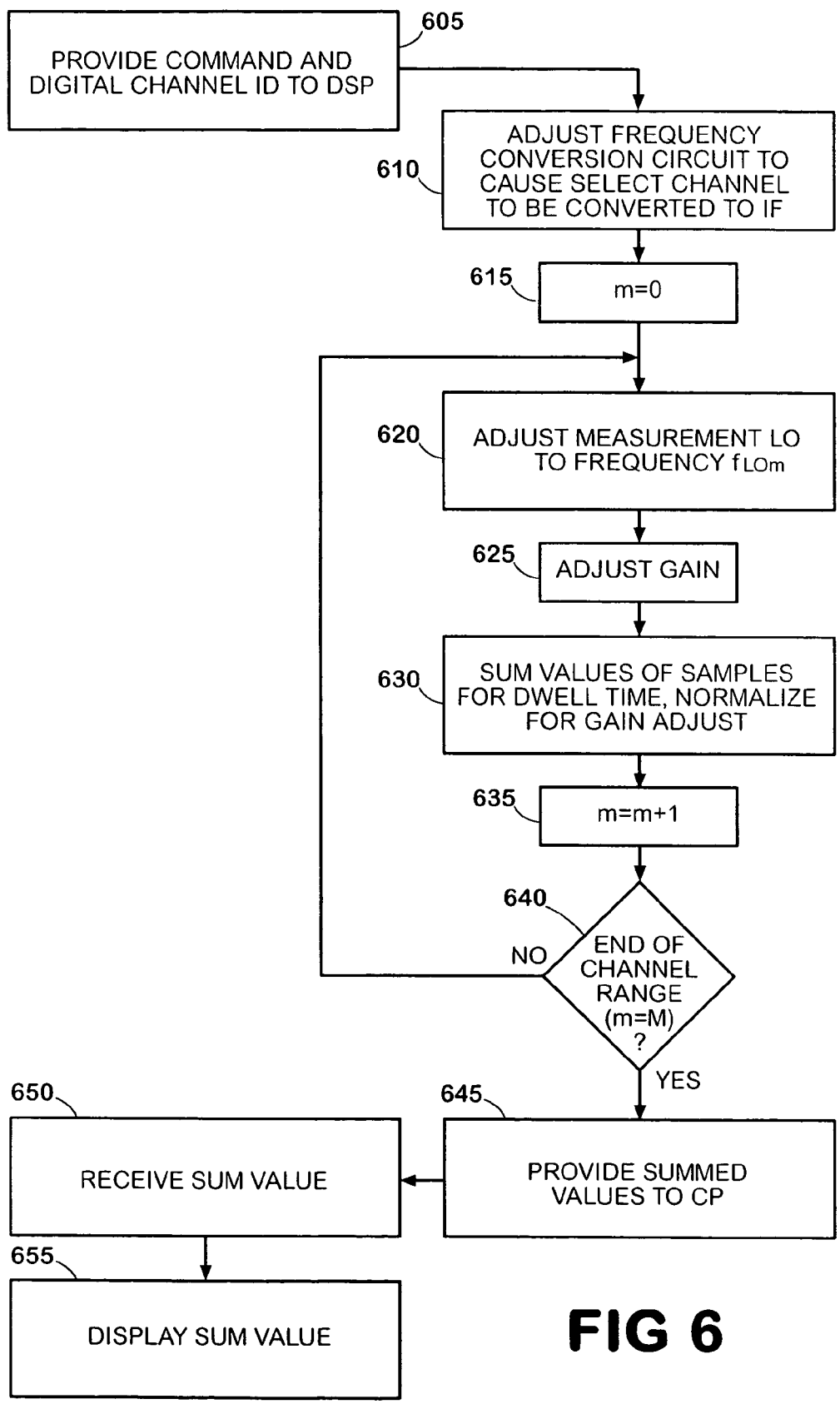
FIG. 6 shows a flow diagram of an exemplary set of operations that may be carried out within the test apparatus of FIG. 3 to carry out digital signal level measurements.

FIG. 6 shows an exemplary set of operations performed by various processing elements in the measurement device 300 of FIG. 3 in order to perform a signal level measurement on a channel N having a channel frequency $f_N$.

Referring to FIGS. 3 and 6 together, the control processor 370 first provides an digital channel SLM command and a channel identification value to the DSP 366 in step 605. The channel identification value corresponds to the channel N and/or channel frequency $f_N$ to be measured. The digital channel SLM command corresponds to a request to perform a digital channel signal level measurement on the channel N.

In step 610, the DSP 366 provides to the control interface 314 of the tuner circuit 302 a tuning signal that corresponds to the channel N. The control interface 314 provides appropriate control signals to the frequency conversion circuit 308 to cause the frequency conversion circuit to tune to the channel frequency $f_N$, similar to step 510 of FIG. 5, discussed above. The DSP 366 may further provide a control signal to the control interface that causes the switch 310 to provide a direct connection between the input 309 and the frequency conversion circuit 308.

Responsive to these signals, the frequency conversion circuit 308 receives broadband signals from the input 309, which is connected to the broadband land-based network (e.g. an HFC network such as the network 110 of FIG. 1). The frequency conversion circuit 308 converts the signal such that the channel frequency $f_N$ is centered around the IF of the tuner circuit 302. The frequency converted input signal propagates to the splitter 350 of the measurement circuit 304. The splitter 350 provides the IF signal to the measurement mixer 354.

Contemporaneously, in step 615, the DSP 366 sets a counter m equal to 0. In step 620, the DSP 366 provides a signal to the measurement LO 355 that causes the measurement LO 355 to provide a LO frequency $f_{LOm}$ corresponding to an mth band of the digital channel to be measured. The frequency $f_{LOm}$ corresponds to the frequency to be mixed with converted input signal received from the splitter 350 in order to center the desired portion of the channel N to be centered about 10.7 MHz.

In general, the digital channel SLM is performed differently than analog television signals because digital channels have different characteristics. Digital channels typically comprise QAM or QPSK modulated digital information. The magnitude of the signal at any one instant cannot be predicted as a practical matter. As a consequence, the digital channel SLM typically involves measuring the energy within several sub-bands of the channel.

Figure 7:
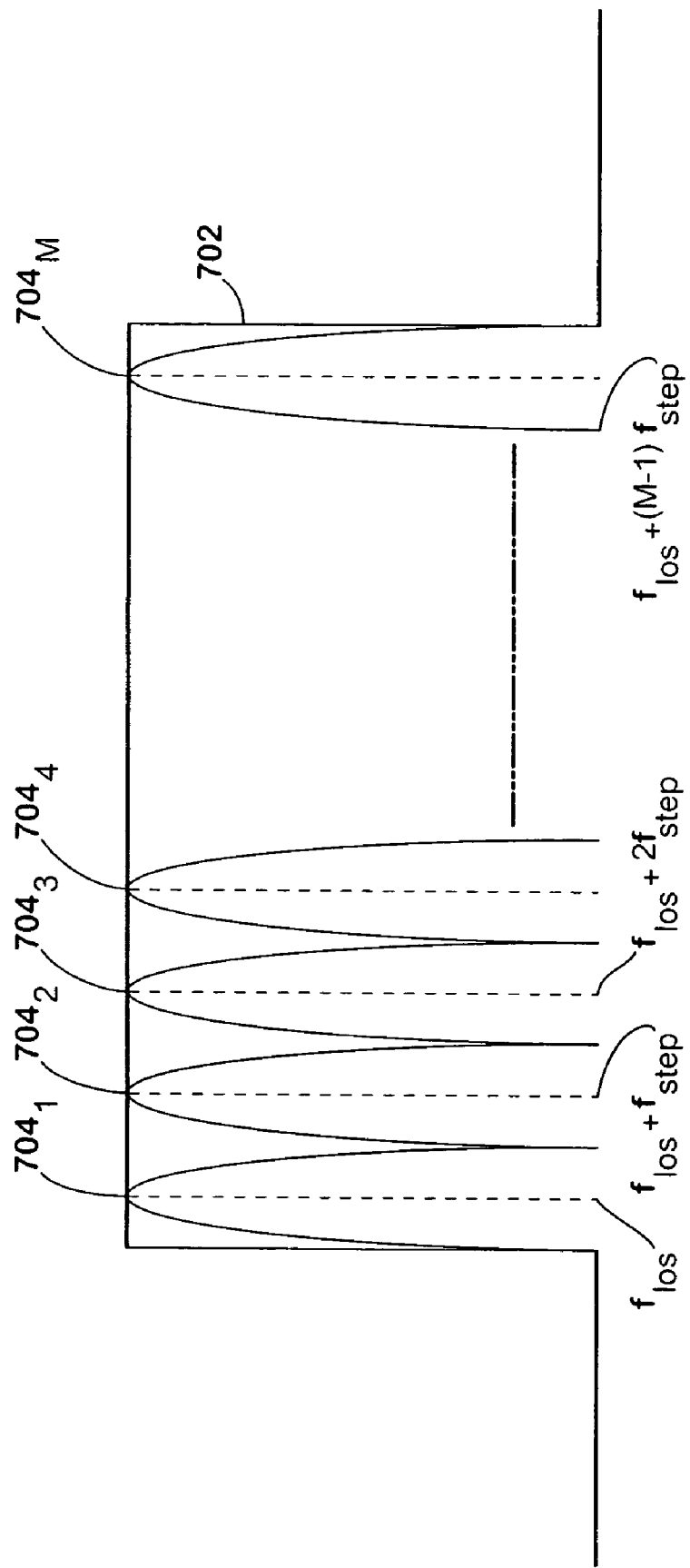
FIG. 7 shows an frequency domain representation of a digital channel signal and a plurality of measurement bands within the channel signal spectrum.

For example, FIG. 7 shows an exemplary frequency spectrum 702 of a digital channel N. The method of measuring the digital channel employed by the device 300 is to obtain an energy level measurement of a plurality of M different frequency bands $704_0, 704_1, \ldots, 704_{M-1}$ of the digital channel N. The M different frequency bands can be selected such that the entire area under the channel bandwidth 702 is substantially "covered", as effectively illustrated in FIG. 7. Alternatively, the measurement of the channel may be made by selected a set of M different frequency bands that span the channel bandwidth, but with large or small band gaps in between. The energy levels of the unmeasured gaps in the frequency spectrum 702 can be interpolated from the measured frequency bands.

Referring to again to FIG. 6, the DSP 366 in step 620 causes the $f_{LOm}$ to be set to a starting frequency $f_{LOS}$ plus $m*(f_{step})$, where $f_{LOS}$ is the starting frequency in the IF channel band, m is the band counter, and $f_{step}$ is the frequency step between measured bands. In the exemplary embodiment described herein, $f_{step}$ is approximately equal to the bandwidth of the energy measurement, or 330 kHz.

In any event, responsive to the control signal received from the DSP 366 in step 620, the measurement LO 355 provides an oscillator signal having the frequency $f_{LOm}$ to the measurement mixer 354. The measurement mixer 354 mixes the converted broadband input signal with the oscillator signal to generate a new converted signal in which the desired portion (i.e. band $704_m$ of FIG. 7) of the channel N is centered around 10.7 MHz. The IF filter 356 filters the new converted signal to produce an IF signal containing substantially only the desired portion (approximately 330 kHz signal band) of the channel N. The remaining portions of the converted broadband input signal are largely filtered out.

The IF signal propagates to the gain adjustment amplifier 362. The gain adjustment amplifier 362 provides a gain adjusted IF signal to the ADC. The ADC 364 provides a sampled IF signal to the DSP 366.

In step 625, the DSP 366 adjusts the gain of the gain adjustment amplifier 362 such that the samples generated by the ADC 364 are within a good operating window of the dynamic range of the ADC 364. Thus, DSP 366 uses the received samples to determine the appropriate adjustment. The adjustment may occur in the sequence shown in FIG. 6 or at some other part of the process.

Thereafter, in step 630, the DSP 366 sums the samples to obtain a running total of the samples, preferably normalized for the gain adjustment applied in step 625. The DSP 366 maintains a running sum of sample values through all of the M measurement bands of the channel N. Thus, the DSP 366 maintains a running sum through several executions of steps 615, 620, and 630.

The number of samples that are added to the running sum in each execution of step 630 correspond to the dwell time of the measurement. The dwell time should be sufficient to obtain enough samples that summed samples represent a well-distributed random sample of the band m. In particular, the IF signal contains modulated QAM signals that will appear pseudo-random over time, as is known in the art. By taking enough samples to exploit the pseudo-random nature of digital QAM signals, any undesirable effect of the data content on the digital channel SLM can be substantially reduced if not eliminated. Nevertheless, the dwell time should be relatively short, as far as human perception goes (i.e. less than a few seconds).

In any event, once the accumulation of sample values for the band m of the channel N is complete, then the DSP 366 in step 635 increments the counter m. In step 640, the DSP 366 determines whether m is equal to total number of bands M for which measurements are to be taken. If so, then the DSP 366 proceeds to step 645, discussed below. If not, then the DSP 366 returns to step 620 to adjust the measurement LO 355 to $f_{LOm}$ where m has been incremented (see step 635). The DSP 366 then proceeds accordingly from step 620 as discussed above.

In step 645, the DSP 366 converts the summed sample values to a value that is expressed in standard output units, if necessary, and provides the final SLM value to the control processor 370. It is noted that if the gain is adjusted multiple times during the measurement process described above, then each sample should be normalized using the gain value employed by the gain adjustment amplifier 362 at the time the sample is recorded, as also discussed above in connection with step 630.

In any event, in step 650, the control processor 370 receives the information. In step 655, the control processor causes information representative of the signal level measurement value to be displayed on the display 382. The signal level measurement value may be displayed graphically, textually, or a combination of both.

Sweep Measurements

For both of the digital and analog signal measurements, it may be desirable to perform a sweep measurement. A sweep measurement is a SLM-type measurement performed over a sequence of channels, preferably in a predetermined sequence. The channels to be swept may be determined by the technician and entered via the keypad 380 and/or display 382. Alternatively, the channels to be swept could be communicated via digital signal received by the receiver circuit 328, or preprogrammed in the memory 372.

In general, the DSP 366 carries out a sweep method by automatically performing measurements (such as those in FIG. 5 or 6) for each of the plurality of channels on the sweep list. In some cases, channels without content are not measured, and in other cases the unused channels may carry a test signal to facilitate the sweep measurement. Some sweep methods, including those that require a test signal to be inserted on an unused channel, require coordination with another test device located at the headend of the cable system.

Coordination with the another test device may occur using special telemetry signals. The telemetry information may identify, for example, the identification of channels that require a test signal. The control processor 370 typically generates the telemetry information and provides the telemetry information to the digital transmission circuit 326. The digital transmission circuit 326 may then frequency modulates the telemetry information and transmits the RF signal containing the telemetry information upstream on the HFC network using the tuner circuit 302.

Various downstream channel sweep methods are known in the art.

DOCSIS Testing

Another testing function of the device 300 is testing the physical layer characteristics of the physical layer connection in the HFC system under test. Referring also to FIG. 1, there are a number of tests that are useful in determining the efficacy of the physical layer high speed data link between the individual customer premises 122 on the HFC network 110 and CMTS 134 or other elements of the network headend 112.

Figure 8:
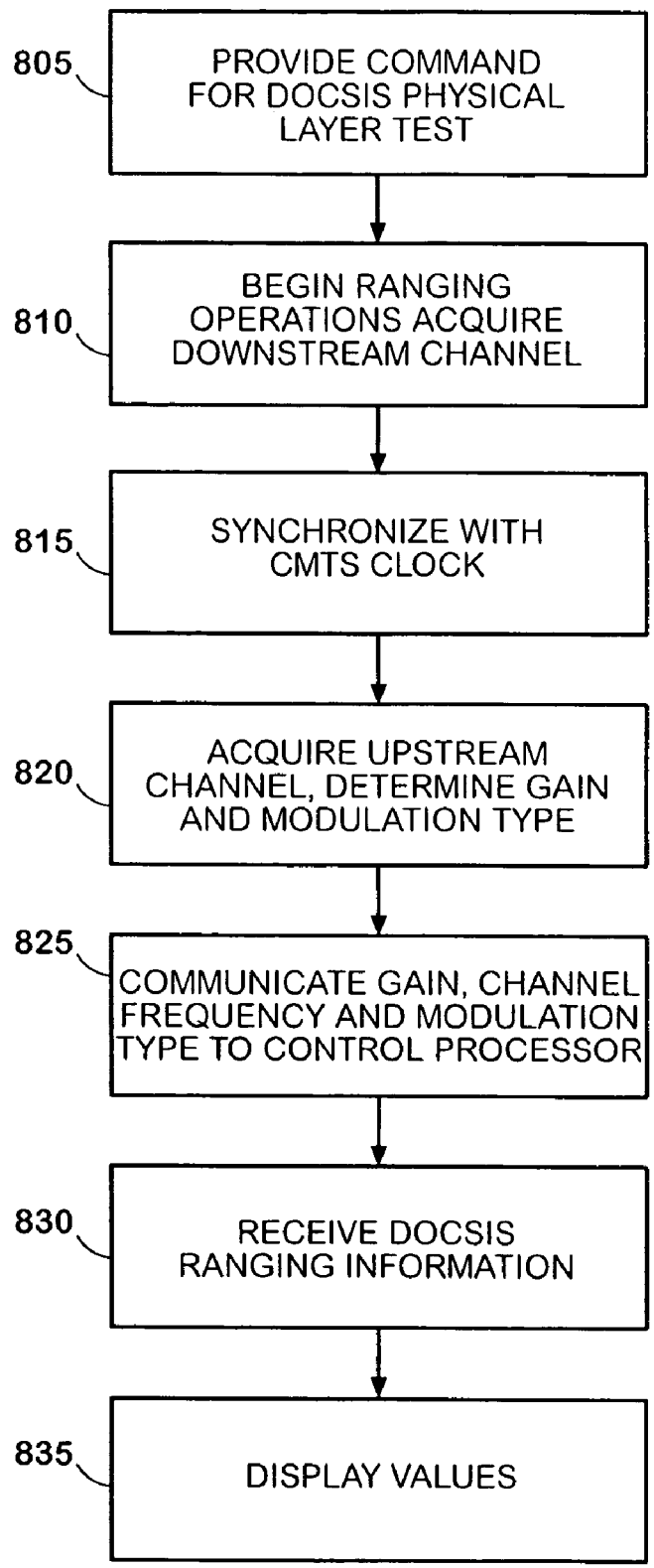
FIG. 8 shows a flow diagram of an exemplary set of operations that may be carried out within the test apparatus of FIG. 3 to carry out an exemplary set of physical layer tests.

FIG. 8 shows an exemplary set of steps carried out by one or more processors to carry out physical layer testing. In general, the control processor 370 and the CPU 408 of the modem circuit 332, which as described above is preferably the Broadcom BCM3352 modem circuit, perform the various steps of FIG. 8.

In step 805, the control processor 370 sends a command signal to the CPU 408 to perform a physical layer test to the DOCSIS modem 402. The control processor 370 provides the command signal through the RS-232 connection 434 or the USB connection 432. Within the modem circuit 332, the RS-232 transceiver 420 or the USB receiver 418 propagates the command signal over the bus 416 to the CPU 408. In general, the physical layer test involves the initial portion of the connection of the DOCSIS modem 402 to the CMTS of the system. This initial portion of such a connection is known in the art as ranging. Steps 810 to 820, discussed below, perform a DOCSIS modem ranging operation.

In addition, in step 805, one or more of the processing devices (CPU 408, control processor 370, DSP 366) ensures that the RF switch 310 is in a position wherein the RF input 309 is connected to the shared input line 318 and the frequency conversion circuit 308 is connected to the downstream output 320 of the diplexer circuit 312. In one example, the control processor 370 provides a suitable command signal to the DSP 366, and the DSP 366 provides a corresponding command signal to the RF switch 310 via the tuner interface circuit 314. However, it will be appreciated that other control signals may be used and still achieve many of the advantages of the invention.

In step 810, the CPU 408 begins the ranging operation by performing the operations with the elements of the modem circuit 332 to acquire a downstream channel. Such operations would be known to those of ordinary skill in the art, and are preconfigured in the BCM3352 modem circuit. Such operations are accomplished through signaling to the CTMS 134 as is known in the art.

In general, signaling and other communications with the CMTS 134 are carried out by communicating information between the CMTS 134 and the DOCSIS modem 402 through the diplexer circuit 312, the RF input 309, the subscriber drop line 120 (FIG. 1), the network tap line 118, the cable plan 116, the optical/digital converter node 126, the fiber plant 114, the optical/digital converter 124 and the combiner 136. Further detail regarding this communication path is provided below in connection with FIG. 9.

In step 815, the CPU 408 continues the ranging operation by synchronizing the DOCSIS modem 402 with the clock of the CMTS 134. Such operations are also known, and are preconfigured in the BCM3352 modem circuit. In step 820, the CPU 408 performs operations with the elements of the modem circuit 332 and output amplifier 348 (via control input 348a) to acquire an upstream channel and determine the appropriate modulation type (QPSK or QAM) and the amplification necessary to achieve adequate transmission quality for the channel and modulation type. Such operations are also known, and are preconfigured in the BCM3352 modem circuit.

In step 825, the CPU 408 communicates to the control processor 370 the transmit gain level, the center frequency of the transmission channel, and the modulation type. Such information is readily available from the CPU 408. For example, the Reference Design of the BCM3352, discussed above, provides the information necessary to obtain the information from the CPU of the BCM3352. The CPU 408 preferably communicates the information to the control processor 370 via the bus 416 and either the RS-232 transceiver 434 or the USB connection 432.

In step 830, the control processor 370 causes the display 380 to display information representative of the transmission gain level, the upstream frequency, and the modulation type, or a subset thereof. It is noted that other information such as the assigned downstream channel may also be provided by the CPU 408 and displayed, as well as other information.

It is noted that if any step in the ranging operation fails, information regarding such failure may also be transmitted by the CPU 408. The CPU 408 of the BCM3352, for example, inherently generates an error value or flag identifying the source of a ranging operation failure, such as a failure to acquire a downstream channel, failure to synch with a CMTS clock or failure to configure an upstream channel. In the embodiment described herein, the CPU 408 is configured to communicate the failure identification information to the control processor 370. The control processor 370 may then display information representative of the failure.

Modem Registration Testing

Another test performed by the device 300 relates to the establishment of an IP layer connection between the DOCSIS modem 402 of the modem circuit 332 and the Internet via the CMTS of the broadband system. Such testing has many uses. For example, referring to FIG. 1, if one or more customer premises 122 are experiencing difficulty connected to the Internet 150, the problem relate to IP layer connection problems, which would not necessarily manifest themselves in a test of the physical layer communications described above. IP layer connection problems can result in failure to obtain an IP address, improper configuration and the like. IP layer connection problems can result from improper configuration of the CMTS 134 (or other servers) at the headend 112.

Figure 9:
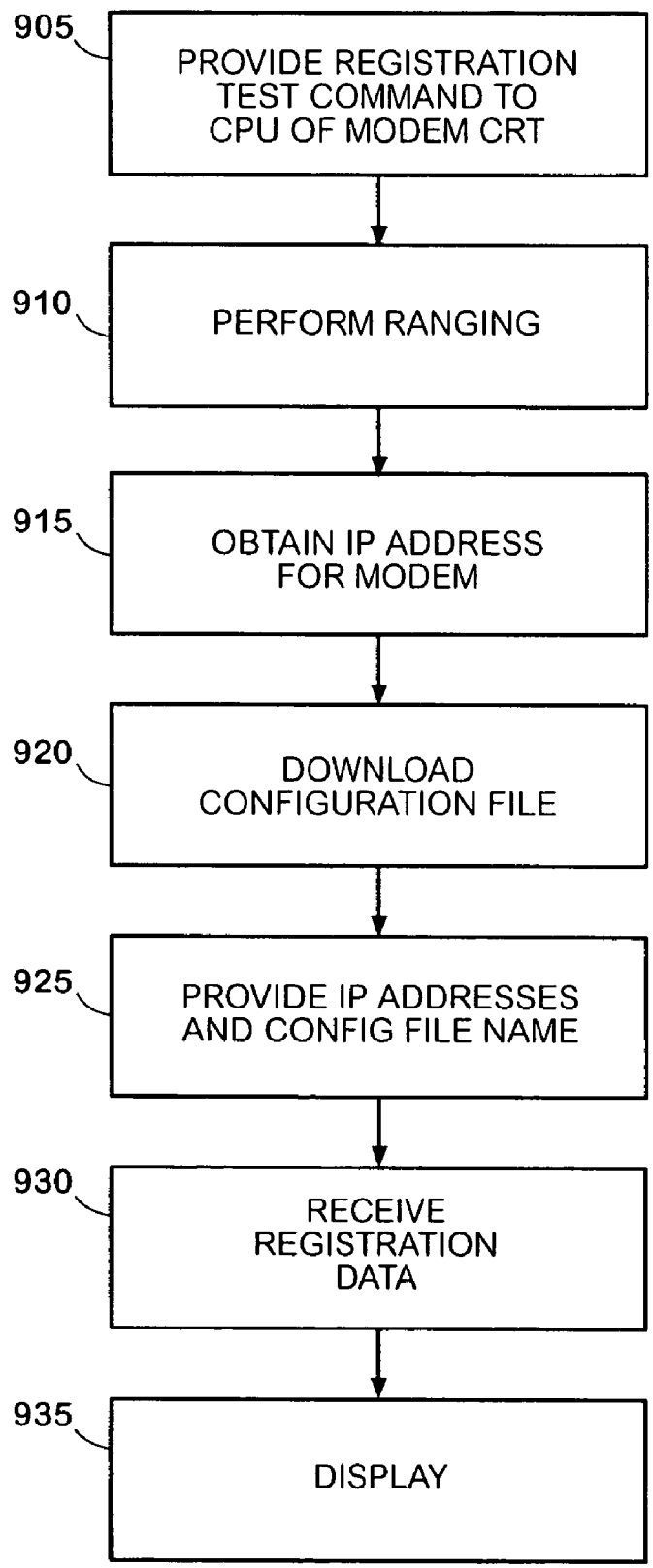
FIG. 9 shows a flow diagram of an exemplary set of operations that may be carried out within the test apparatus of FIG. 3 to carry out a exemplary set of modem registration tests.
Figure 10:
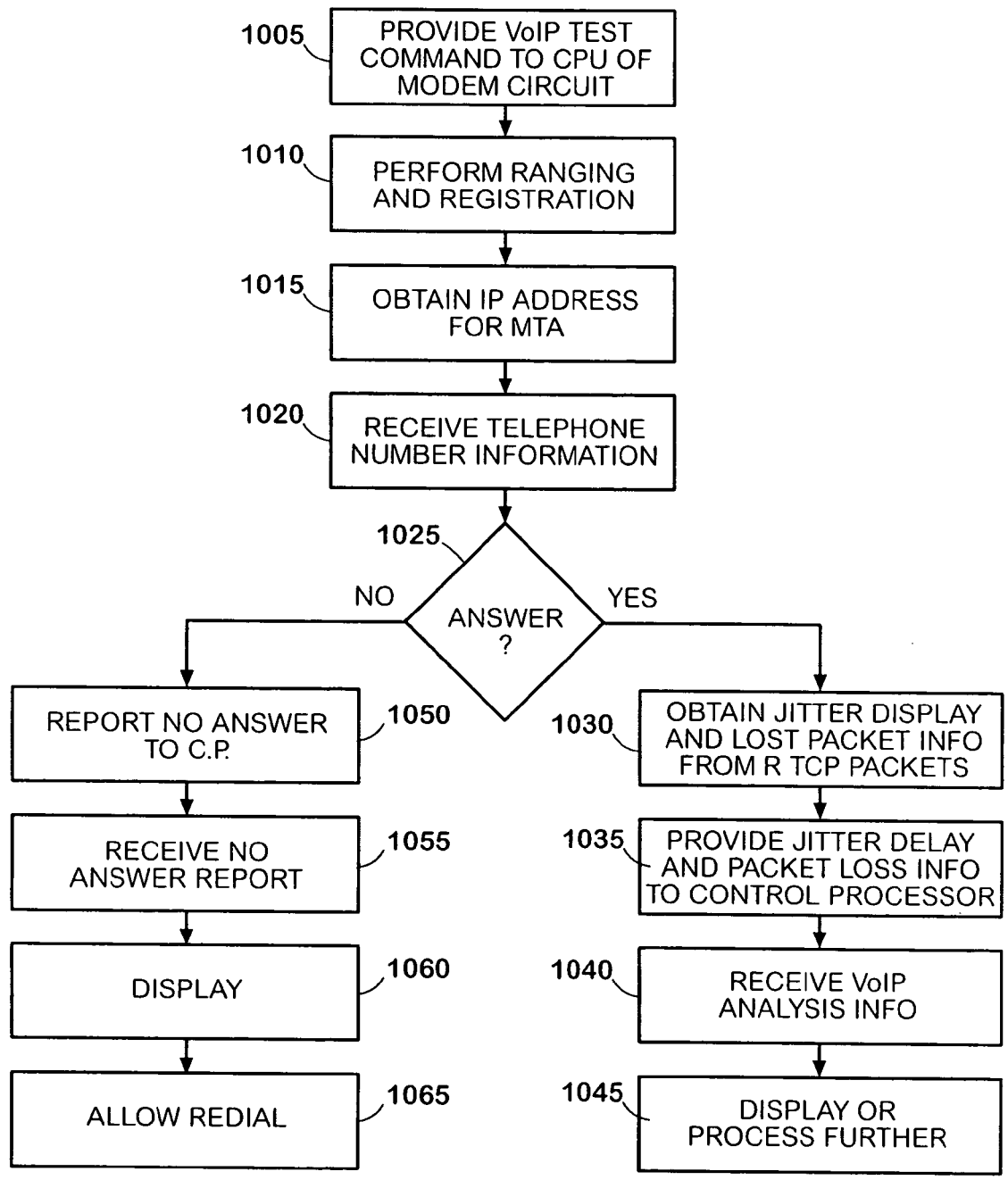
FIGS. 10 and 11 show flow diagrams of other exemplary sets of operations that may be carried out within the test apparatus of FIG. 3.

FIG. 9 shows an exemplary set of operations that may be used to perform a set of IP layer tests for determining the connectivity of a DOCSIS modem. In general, the device 300 attempts to establish modem registration of the DOCSIS modem 402 on the system under test at a location on the network. The device 300 obtains and displays various IP connection related values that provide an indication as to whether various elements that are necessary to establish an IP connection are functioning. If the test provides expected results, then the IP connection between to the DOCSIS modem 402 is presumably functioning.

One advantage of such a test is that it can assist in distinguishing a problem with the IP elements of the network 110 (most of which are located at the network headend 112) and problems at with the customer premise equipment, such as the customer cable modem 130 or attached customer premise equipment such as a computer.

Referring now to FIG. 9, with reference to FIGS. 1, 3 and 4, in step 905, the control processor 370 sends a command signal to the CPU 408 to perform a modem registration test with the DOCSIS modem 402. Registration is one of the steps performed by a DOCSIS modem to establish an Internet Protocol layer connection with a CMTS of an HFC or other cable network. The control processor 370 provides the command signal through the RS-232 connection 434 or the USB connection 432. Within the modem circuit 332, the RS-232 transceiver 420 or the USB receiver 418 propagates the command signal over the bus 416 to the CPU 408.

In addition, in step 905, one or more of the processing devices (CPU 408, control processor 370, DSP 366) ensures that the RF switch 310 is in a position wherein the RF input 309 is connected to the shared input line 318 and the frequency conversion circuit 308 is connected to the downstream output 320 of the diplexer circuit 312. Step 805, discussed above, provides additional information on this process.

In step 910, the CPU 408 causes the elements of the modem circuit 332 to perform a ranging operation similar to that of steps 810, 815 and 820 of FIG. 8. The CPU 408 (and control processor 370) may optionally cause display of the physical layer characteristic as per steps 825, 830 and 835 of FIG. 8. If ranging fails, the CPU 408 and control processor 370 may cooperate to communicate information regarding the failure via the display 382 as discussed above in connection with FIG. 8.

If the ranging operation is successful in step 910, then the CPU 408 proceeds to step 915. In step 915, the CPU 408 continues with the registration process by obtaining an IP address from the headend network 112, and in particular, the DHCP 144, which assigns IP addresses as is known in the art.

In particular, the CPU 408 and the DOCSIS modem 402 cooperate as is known in the art to generate a request for an IP address and connection to the Internet 150, or at least to the local headend network 138. The request is in the form of one or more standard Ethernet packets with appropriate header information and format for communication via the Internet 150. The QAM transmitter 412 receives the data packets and modulates the data packets in accordance with the frequency and modulation type defined during the ranging step 910. The QAM transmitter 412 provides the modulated data packets to the amplifier 348, which in turn amplifies the modulated data packet signal.

The amplifier 348 provides the modulated data packet signal to the upstream input 316 of the diplexer circuit 322. The signal propagates through the upstream filter 322 and then through the shared signal line 318 to the RF input 309.

Referring also FIG. 1, assuming that the RF input 309 is connected to the position on the network at which the analysis device 100 is connected, the modulated data packet signal propagates onto the system 110 at the customer premise 122. As with all upstream information, the modulated signal propagates upstream through the associated subscriber drop line 120, the network tap line 118, and the cable plant 116 to the node 126. The node converts the RF signal to an optical signal and provides the signal to headend optical/RF converter 124. The headend optical/RF converter 124 converts the signal back to an RF signal and provides the signal to the CMTS 134 through the splitter 136.

The CMTS 134 then cooperates with other elements on the server network 138 (as well as the DOCSIS modem 402) to establish the IP connection with the DOCSIS modem 402. To this end, the TFTP 140 identifies a configuration file for the DOCSIS modem 402 that identifies its parameters of service, the TOD server 142 coordinates the time stamp information for packets communicated to and from the DOCSIS modem 402, and the DHCP server 144 assigns an IP address. The above described modem registration operations are described in simplified format because they are generally known in the art. Such operations may involve additional upstream and downstream communications between the CMTS 134 and the modem circuit 332.

Communication of downstream signals occurs in a manner analogous to the communication of upstream signals. Downstream signals are modulated onto the downstream RF channel assigned to the modem circuit 332 during registration in step 910. The downstream signals propagate down the network 110 through the headend optical/RF converter 124, the optical plant 114, the converter node 126, the cable plant 116, the network tap line 118 and the subscriber drop line 120 to the RF input 309 of the measurement device 300.

Within the subscriber device 300, the downstream data packets propagate through the switch 310 and the shared signal line 318. Because the downstream channel assigned to the DOCSIS modem 402 is in the assigned downstream spectrum between 80 MHz and 1000 MHz (in the U.S.), the received RF signal is rejected by the upstream filter 322 and passed by the downstream filter 324. The received RF signal thus propagates through the downstream output 320 to the frequency converter 308 (which has been tuned to a predetermined frequency via the CPU 408, control processor 370 and the DSP 366). Downstream signals thereafter propagate through the splitter 350 and the receiver amplifier 352 to the QAM receiver 410. The QAM receiver 410 demodulates the received signals and provides packets to the DOCSIS modem 402 under the control of the CPU 408.

During the registration process described above, as is known in the art, the CMTS 134 communicates to the modem circuit 332, among other things, the IP addresses of the TFTP server 140, the TOD server 142, and the DCHP server 144. The CPU 408 obtains and retains such information.

In step 920, CMTS 134 downloads the configuration file from the TFTP server 140 to the modem circuit 332, which is also stored or at least accessible by CPU 408. Steps 915 and 920 are inherent to normal DOCSIS registration processes.

In step 925, the CPU 408 provides various IP connection information obtained in steps 915 and 920 to the control processor 370 via, preferably the USB transceiver 418 and USB connection 432. The IP connection information in the embodiment described herein includes the IP address assigned by the DHCP server 144 to the DOCSIS modem 402, the IP addresses of the TFTP server 140, the TOD server 142, the CMTS 136, and the DHCP server 144, and the name of the configuration file for the DOCSIS modem 402. The IP connection information may also include a basic indication of whether registration was successfully completed, either expressly or implicitly within other IP connection information.

In step 930, then the control processor 370 obtains the IP connection information from the CPU 408 of the modem circuit 332. In step 935, the control processor 370 causes some or all of the IP connection information to be displayed. By displaying such information, the technician may obtain insight into the IP connection operation, which may be used in any of a plurality of ways. For example, the display of the IP addresses of the various servers 140, 142, 144 may help determine that the CMTS 136 is properly identified and is communicating with the appropriate elements at the headend 112 to establish the IP connection.

To this end, the technician may compare the server IP addresses as reported by the CPU 408 with expected values. The technician presumably has access to the actual IP addresses of the server network 138, and thus may make a visual comparison. Alternatively, the control processor 370 (and/or the memory 372) may be preprogrammed with the actual IP addresses of the various headend servers (i.e. prior to testing), which may then be compared to the "reported" or measured IP addresses of those servers. The control processor 370 may cause the display of the results of such a comparison and/or cause the display of both the preprogrammed and the reported IP addresses.

Similarly, the display of the name of the configuration file received from the CPU 370 may also be used by the technician to help determine, among other things, the proper location and operation of the TFTP server 140. To this end, the name of the configuration file can be compared by the technician (or the control processor 370) with the known configuration file name for the DOCSIS modem 402. Again, because the DOCSIS modem 402 is a special test modem in a measurement device 300, the configuration file name should be available through an independent source.

It is noted that if any step in the registration operation fails, information regarding such failure may also be transmitted by the CPU 408. The CPU 408 of the BCM 3352 inherently generates error codes for failures of various portions of the ranging and registration operations. If any such failure occurs, the CPU 408 is configured to communicate the failure identification information to the control processor 370. The control processor 370 may then display information representative of the failure.

High Speed Data Upstream Performance Test

The Upstream Performance Test (UPT) operation of the measurement device 300 measures several characteristics of the upstream data flow from a DOCSIS cable modem (CM) to the CMTS 134 at the headend of a Hybrid Fiber-Coax CATV network. The upstream performance is affected by the RF characteristics of the customer premise service point 122, the ingress characteristics of the rest of the HFC network 110, and the data traffic from other cable modems 130.

To perform UPT operations, the measurement device 300 can connect directly to the RF coaxial cable at the customer premises 122 or to the data port of the customer cable modem 130 (see FIG. 1). The direct connection would be through a communication port that connects directly the control processor 370 of FIG. 3. The control processor 370 performs many of the same upstream data flow tests in either connection mode. In the data connection mode it functions as a source of upstream data to be sent through the cable modem 130 attached at the service point being tested. In the RF connection mode it functions as a data source and also as a cable modem (DOCSIS modem 402) attached at the service point being tested. One test is available only in the RF mode because it must alter the data at a lower level than can be done through the customer's cable modem 130.

The UPT tests any or all of these characteristics of upstream performance:

1. Packet loss ratio from the cable modem 402 or 130 at the test service point;
2. Upstream data throughput of the cable modem 402 or 130 at the service point under test;
3. Upstream bit error rate (BER) in packets from the cable modem 402;
4. Signal-to-noise ratio (SNR) at the CMTS 134 from the cable modem 402;
5. Performance statistics of other cable modems attached to the same network and sharing the same upstream data channel (the CM pool statistics)
6. Comparison of performance measurements of the test CM 130 to those in the CM pool;

Many of the tests use features of the Internet Protocol (IP). A subset of this protocol, the Internet Control Message Protocol (ICMP), includes an Echo Request message that can be sent from one network device to another. The source and destination devices are designated in the message by their respective IP addresses. The destination device responds to the Echo Request by sending an Echo Reply message of the same length back to the source of the Echo Request. This protocol is commonly known as "ping."

In the upstream packet loss test, the control processor 370 causes ping packets to be sent to the CMTS 134. Noise on the upstream channel may corrupt some of these packets and cause them to be unrecognizable at the CMTS 134. Those that reach the CMTS 134 will cause it to send an echo reply. Some of these may be corrupted and lost due to noise on the downstream channel.

In order to distinguish between the two types of losses, the UPT uses the Simple Network Management Protocol (SNMP) to read upstream packet counters at the CMTS 134. It reads them both before and after a sequence of pings is sent.

Note: The DOCSIS protocol uses Forward Error Correction (FEC) encoding at the CM (402 or 130) in order to reduce the rate of packet loss. The packet loss test counts only those packets with corruption exceeding the correction capacity of the FEC decoder as lost packets.

The upstream data throughput test loads the upstream data flow with a constant stream of messages. It determines the upstream throughput by dividing the number of bits sent in a measured time interval by the duration of the interval.

In an upstream throughput test, the control processor 370 causes pings to load the upstream data flow. The CMTS 134 limits the overall throughput of the test CM, not just the upstream. In order to get the maximum upstream performance, the UPT must keep downstream loading to a minimum. It uses a variation of the standard ICMP echo request that causes large upstream packets to generate small downstream replies. It does this by adding extra padding to the upstream request at the Ethernet level, not the ICMP level. The CMTS 134 sends replies that match the length of the ICMP request but do not contain the Ethernet-level padding.

The upstream bit error rate is calculated from the number of upstream packet errors and the number of bits in a packet. It disables or diminishes the FEC in the upstream channel so that a single bit error or a small, controlled number of symbol errors will cause a packet error. It uses two methods to do this:

a. For DOCSIS 1.1 and higher, the control processor 370 and/or the CPU 408 establish a dynamic service flow (an upstream data flow) and choose the amount of error correction that will be applied.
  b. For DOCSIS 1.0, which has no dynamic service flow capability, it determines the number of symbols that the FEC is able to correct. The control processor 370 and/or the CPU 408 insert a number of symbol errors after FEC encoding the data but before sending it. In order to disable or diminish FEC it inserts the difference between the code's symbol correction capability and the correction capability needed for the measurement.

The BER calculation also requires a statistical estimate of the number of bit errors in a failed packet. This step employs a statistical model of the channel noise distribution obtained from the measured packet error rates.

The SNR and received power level of the test CM is measured directly by the CMTS 134, which may suitably include an SLM device similar to that of the device 300. The control processor 370 may employ the modem circuit 332 to request these values periodically using SNMP. The device 300 also reads the SNR and received power level of other active CMs on the same upstream channel. Furthermore, using SNMP requests, it obtains IP addresses of the CMs and sends SNMP requests to them to get their transmit levels. The UPT subtracts the receive power level from the transmit power level for each CM to get its upstream path loss (UPL). It then displays the lowest, highest, and average SNR and UPL of a large sample set of CMs on the upstream channel. In order to relate the performance of the CM under test to the other CMs on the upstream channel, the UPT shows where the measured values for the CM under test fall within the range of values obtained for the CMs in the sample set.

The UPT uses SNMP requests to the CMTS to get other performance measures for CMs in the sample set. The CMTS measures and reports the path delay time for each CM. The UPT requests received byte counts for other CMs in the sample set periodically. It divides the difference in byte counts by the elapsed time between requests to get the upstream data rate for each CM in the sample set.

Downstream Throughput and Ping Tests

The control processor 370 and CPU 408 are also configured to perform downstream Ping and throughput testing. In general, the control processor 370 first obtains an IP address and is registered as customer premise equipment. Then the control processor 370 executes a ping test. For a throughput test, the control processor 370 requests a download of a large file stored at the headend 112.

The amount of data received over a finite period of time yields the actual throughput. Because of possible download speed issues associated with the USB transceiver 418 and RS-232 transceiver 420, it is preferable to conduct the downstream throughput test such that the downstream packets are received and "counted" by the CPU 408. To this end, the CPU 408 may be programmed to "intercept" IP packets addressed to the IP address assigned to the control processor 370, at least for the download throughput test. After the test, the CPU 408 would no longer intercept IP packets addressed to the control processor 370.

In such an embodiment, the CPU 408 communicates the information representative of the measured throughput to the control processor 370. The control processor 370 thereafter may cause such information to be displayed on the display 370, and/or may compare the throughput to one or more thresholds.

VoIP Performance Test

The measurement device 300 is further operable to provide to a technician information regarding the quality of VoIP service on the network under test (e.g. the network 110 of FIG. 1). In particular, as will be discussed below, the measurement device 300 displays to the technician various measures of quality of VoIP service including packet loss, delay (or latency), and jitter.

To this end, in step 1005, the control processor 370 provides a VoIP test command to the CPU 408 of the modem circuit 332.

In step 1010, the CPU 408 cooperates with the other elements of the modem circuit 332 to perform ranging and registration of the DOCSIS modem 402. To this end, the CPU 408 may suitably perform the relevant steps of FIGS. 8 and 9 discussed above. Moreover, the CPU 408 and the control processor 370 may suitably cooperate to cause the display of test information derived from the ranging and registration operations as discussed above in connection with FIGS. 8 and 9. It is noted that the initial registration and ranging operation will involve the communication of a request for a VoIP connection as opposed to an ordinary high speed data IP connection. Such operations are known in the art. In addition, the BCM3352 circuit is preconfigured to perform such operations.

In any event, once the DOCSIS modem 402 is registered, the CPU 408 cooperates with the DOCSIS modem 402 and the MTA 404 to register the MTA 404 for VoIP service in step 1015. Again, details regarding the specifics of registering an MTA are known in the art, and the BCM3352 circuit is preconfigured to perform this operation. As a result of the registration, the MTA 404 obtains an IP address. The other servers 146 perform additional signaling to obtain a POTs telephone connection through a POTs central office. Upon registration of the MTA 404 and obtaining a telephone central office connection, information representative of the available connection is communicated from the headend 112 to the modem circuit 332 as is known in the art.

Responsive to receiving such information, the modem circuit 332 generates a dial tone that propagates through the codec 406 to the speaker phone chip 374. The speaker phone chip 374 provides a signal to the speaker 378, which in turn produces an audible dial tone.

In step 1020, a telephone number is "dialed". In particular, once the MTA 404 obtains an IP address, the CPU 408 notifies the control processor 370, which in turn causes the speaker phone chip 374 to automatically generate the tone dialing sequence of a predetermined telephone number. Alternatively, because successful registration of the MTA 404 will result in an audible dial tone in the speaker 378, the telephone number may suitably be dialed by the technician using the keypad 380. The telephone number may be any active telephone number, but preferably is the number of a telephone answering system associated with a voice reproduction or voice simulation device that can provide measurable audio data over a telephone connection.

Responsive to the selected telephone number, the MTA 404 and DOCSIS modem 402 cooperate to provide the dialed telephone number information to the headend 112 and the appropriate VoIP servers.

In step 1025, different actions may occur depending on whether the initiated call results in a connection to another telephone device. If the initialed call is answered, the the CPU 408 proceeds to step 1030.

In step 1030, after some exchange of audible signals via the VoIP connection, the CPU 408 obtains one or more RTCP packets, which are control packets of a standard VoIP data stream. The RTCP packets contain, among other things, information that identifies delay, packet loss and jitter for a defined time period of the call. The delay is the average delay in the packets through the HFC system, in other words, between the headend 112 and the DOCSIS modem 402. Because the quality of service expectation in telephony, the delay added by the HFC system is required to be within a certain range.

Jitter is a measure of the average difference in delay of packets through the system. In particular, the characteristic of cable telephony is that some packets are delayed more than others. In some cases, the delay differences are such that some packets are received out of order. As a consequence, the MTA 404 includes a FIFO-type buffer. The MTA 404 uses the buffer to buffer received packets and allow for longer delayed packets to "catch up". If the delay varies greatly, the buffer may not be large enough to absorb the difference in delay of adjacent data packets, which can result in lost packets.

Packet loss is a measure of the number of packets actually lost due to jitter or other problems.

Jitter, delay and packet loss are inherently tracked in standard VoIP connections. Accordingly to industry standards, information representative of jitter, delay and packet loss is included in the RTCP packets. In accordance with an embodiment of the present invention, the CPU 408 extracts this information from the RTCP packets in step 1030. Thereafter, in step 1035, the CPU 408 provides the information to the control processor 370.

In step 1040, the control processor 370 receives the information representative of the delay, packet loss and jitter in the VoIP connection. In step 1045, the control processor displays information representative of the delay, packet loss and jitter. The control processor 370 optionally compares one or more these values with one or more thresholds to provide an indication of whether the values are within one or more predetermined limits. Multiple thresholds may be used to define different measures of quality. Thresholds may represent the maximum delay, jitter and packet loss that are acceptable under industry standards, specific standards of the HFC service provider, and/or government regulations.

In any event, the displayed information may be information of the actual delay, jitter and packet loss values, an indication as to whether these values exceed one or more thresholds, or a combination of these.

Referring again to step 1025, if the initiated call is not answered after a predetermined number of rings, the CPU 408 causes the modem circuit 332 to "hang up" or disconnect, and the failure is reported to the control processor 370 in step 1050. In step 1055, the control processor 370 receives the failure to answer signal in step 1055 and causes an indication of such to be displayed or communicated to the user in step 1060. The control processor 370 may then allow a redial with the same or another number in step 1065. Again, the number could be hand-entered by the technician or automatically dialed by the control processor 370.

Internet Connection

The measurement device 300 is also operable to connect to a web site and display contents of that web site using a light client such as a web browser. With this capability, the measurement device 300 can provide access to data or information maintained by the HFC or other parties that is useful during analysis of a customer's HFC service. For example, the measurement device 300 could access historical measurement data for the HFC system that is made accessible on a proprietary website by the HFC service provider. Alternatively, the measurement device 300 could access map databases on the world wide web that would assist a field technician in finding the address of a customer. Several other uses for accessing the web are possible.

Figure 11:
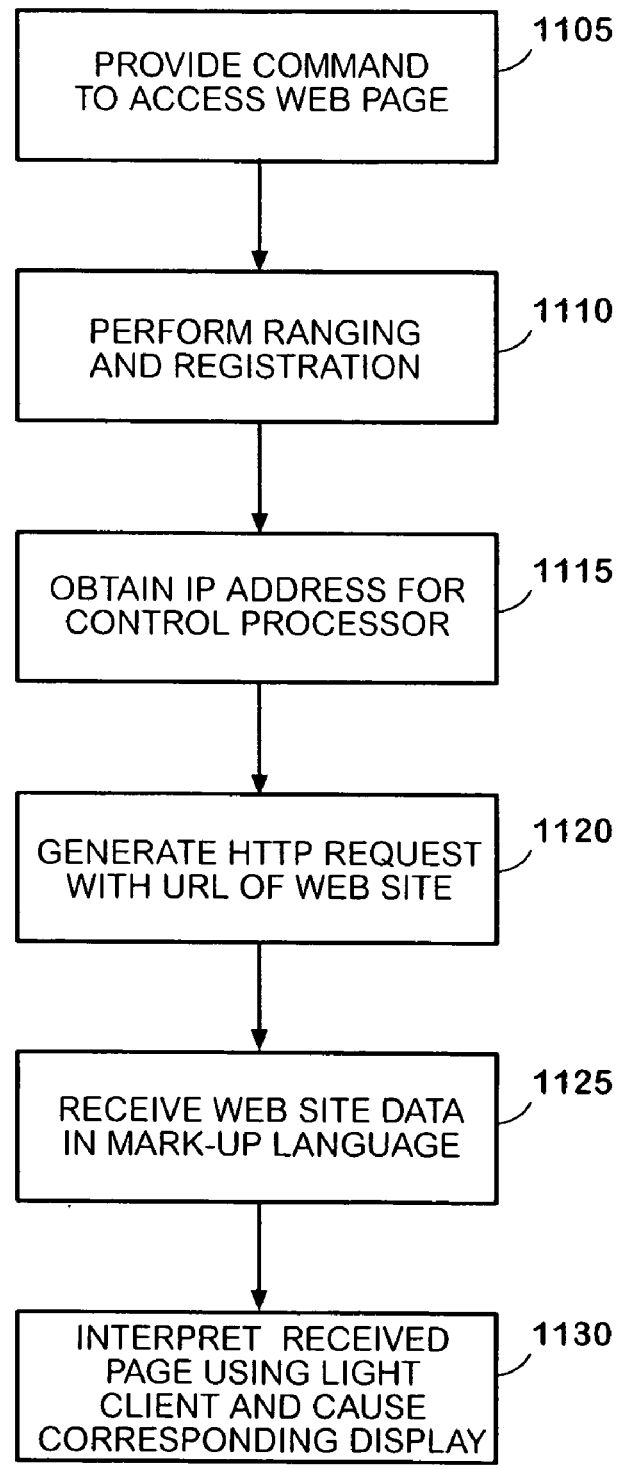

FIG. 11 shows an exemplary set of operations performed by various processing devices in the measurement device to enable web access on the portable measurement device 300.

In particular, in step 1105, the control processor 370 provides an Internet web site connect command to the CPU 408 of the modem circuit 332. Such a command is triggered typically by user entry in the keypad 380.

In step 1110, the CPU 408 cooperates with the other elements of the modem circuit to perform ranging and registration of the DOCSIS modem 402. To this end, the CPU 408 may suitably perform the relevant steps of FIGS. 8 and 9 discussed above. The CPU 408 and the control processor 370 may suitably cooperate to cause the display of test information derived from the ranging and registration operations as discussed above in connection with FIGS. 8 and 9. Such operations are known in the art. In addition, the BCM3352 circuit is preconfigured to perform such operations.

In any event, once the DOCSIS modem 402 is registered, the CPU 408 cooperates with the DOCSIS modem 402 and the control processor 370 to register the control processor 370 as customer premise equipment in step 1115. Again, details regarding the specifics of registering customer premise equipment are known in the art. As a result of the registration, the control processor obtains an IP address.

Once the control processor 370 is registered, the control processor 370 requests a web site in step 1120. The requested website may be entered alphanumerically via the keypad 380, or may be selected from a predetermined list using the keypad 380. The control processor 370 in any event generates the IP packet containing an HTTP request for the URL of the desired website. The control processor 370 provides an HTTP request to the Internet 150 via the DOCSIS modem 402, the transmitter 412, amplifier 348, diplexer circuit 312, RF input 309 and the connected HFC network and headend. Referring to FIG. 1, the website identified by the URL is resident on a computer connected Internet 150, such as one of the computers 152.

If the HTTP request is successful, the website hosting computer 152 provides data packets containing data to be displayed (or otherwise communicated, or executed in the case of a Java applet) in the form of an HTML page (or a page using another mark-up language). These data packets propagate through the network 110 to the input 309, the diplexer circuit 312, the splitter 350, the amplifier 352, the receiver 410 to the DOCSIS modem 402. The DOCSIS modem 402 processes the ordinary modem-level overhead and provides the web site data to the control processor 370.

In step 1125, the control processor 370 receives the web site data, which is in a mark-up language, for example, HTML. The control processor 370 employs a light client, for example, web-browser software, to interpret the web site data. In the exemplary embodiment described herein, the web browser may suitably be the ICEbrowser available from ICEsoft Technologies of Calgary, Alberta, Canada, running on the Vx Works operating system available from Wind River of Alameda, Calif. To facilitate display on the relatively small display necessary for handheld instrument, the web browser is set for 320×240, ¼ VGA.

The control processor 370 thereafter causes information to be displayed in accordance with the web site data and the web-browser in step 1130. Any Java applets may also be executed.

Digital Channel Quality Measurements

An additional measurement capability of the device 300 is the performance of modulation error rate (MER) and bit error rate (BER) calculations, which provide a measure of digital channel quality. The value and use of MER and BER measurements in QAM modulated signals are well known. Detailed discussions of these and other QAM related channel quality measurements are provided in U.S. Pat. No. 6,233, 274, which is incorporated herein by reference.

Information regarding MER and BER in the BCM 3352 is made available through the CPU 408. The information is provided by the CPU 408 to the processing circuit 370 via the USB transceiver 418 or the RS-232 connection 420.

It will be appreciated that the above described embodiments are merely exemplary, and that those of ordinary skill in the art may readily devise their own implementations and adaptations that incorporate the principles of the present invention and fall within the spirit and scope thereof.

I claim:

1. A method for evaluating quality of a voice over internet protocol service on a cable network using an analysis device comprising:

a connector for connecting to a coaxial cable of the cable network, the cable network including a connection to a network employing internet protocol communications;

a display;

a digital communication circuit including a DOCSIS modem and a multimedia terminal adapter, wherein the digital communication circuit is operably connected to the connector and configured to communicate information signals within the cable network via the connector, the digital communication circuit operable to establish a first type of data connection through the cable network, the first type of data connection employing an internet protocol;

establish a second type of data connection through the cable network, the second type of internet data connection comprising a voice over internet protocol; and a processing circuit connected to the digital communication circuit, the method comprising:

(a) causing the processing circuit to provide a voice over internet protocol test initiation command to the DOCSIS modem;

(b) performing ranging and registration of the DOCSIS modem in the communication system to obtain a first diagnostic data;

(c) registering the multimedia terminal adapter for the voice over internet protocol service in the communication system;

(d) causing the processing circuit to generate a tone dialing sequence for a telephone number;

(e) establishing a voice over internet protocol connection between the analysis device and a test telephone device represented by the telephone number; and (f) upon completion of step (e), obtaining a second diagnostic data selected from a group consisting of delay, packet loss, and jitter information, by exchanging audible signals with the test telephone device.

2. The method of claim 1, wherein in step (b), the first diagnostic data is selected from a group consisting of modulation type, channel number, and IP address.

3. The method of claim 1, further comprising (b1) displaying the first diagnostic data on the display of the analysis device, wherein step (b1) is performed after step (b).

4. The method of claim 1, wherein in step (e), the test telephone device is an answering system capable of providing measurable data over the connection therewith.

5. The method of claim 1, wherein in step (f), the processing circuit obtains one or more control packets of a voice over internet protocol data stream.

6. The method of claim 5, wherein in step (f), the second diagnostic data is obtained from the one or more control packets.

7. The method of claim 1, further comprising (f1) displaying the second diagnostic data on the display of the analysis device, wherein step (f1) is performed after step (f).

8. A method for evaluating quality of a voice over internet protocol service on a cable network using an analysis device comprising:

a connector for connecting to a coaxial cable of the cable network, the cable network including a connection to a network employing internet protocol communications;

a display;

a digital communication circuit including a DOCSIS modem and a multimedia terminal adapter, wherein the digital communication circuit is operably connected to the connector and configured to communicate information signals within the cable network via the connector; and a processing circuit connected to the digital communication circuit, the processing circuit operable to cause the display to display information relating to connection parameters and performance of an established connection, the method comprising:

(a) causing the processing circuit to provide a voice over internet protocol test initiation command to the DOCSIS modem;

(b) performing ranging and registration of the DOCSIS modem in the communication system to obtain a first diagnostic data;

(c) registering the multimedia terminal adapter for the voice over internet protocol service in the communication system;

(d) causing the processing circuit to generate a tone dialing sequence for a telephone number;

(e) establishing a voice over internet protocol connection between the analysis device and a test telephone device represented by the telephone number; and (f) upon completion of step (e), obtaining a second diagnostic data selected from a group consisting of delay, packet loss, and jitter information, by exchanging audible signals with the test telephone device.

9. The method of claim 8, wherein in step (b), the first diagnostic data is selected from a group consisting of modulation type, channel number, and IP address.

10. The method of claim 8, further comprising (b1) displaying the first diagnostic data on the display of the analysis device, wherein step (b1) is performed after step (b).

11. The method of claim 8, wherein in step (e), the test telephone device is an answering system capable of providing a measurable data over the connection therewith.

12. The method of claim 8, wherein in step (f), the processing circuit obtains one or more control packets of a voice over internet protocol data stream.

13. The method of claim 12, wherein in step (f), the second diagnostic data is obtained from the one or more control packets.

14. The method of claim 8, further comprising (f1) displaying the second diagnostic data on the display of the analysis device, wherein step (f1) is performed after step (f).

* * * * *